US006615002B2

(12) United States Patent
Saito et al.

(10) Patent No.: US 6,615,002 B2
(45) Date of Patent: Sep. 2, 2003

(54) IMAGE FORMING APPARATUS AND PROCESS CARTRIDGE FOR APPLYING AN ALTERNATING CURRENT TO A CHARGING MEMBER OR CHARGING MEANS FOR CHARGING AN IMAGE BEARING MEMBER

(75) Inventors: Seiji Saito, Shizuoka (JP); Tomohiro Nakamori, Shizuoka (JP); Hiroshi Takami, Kanagawa (JP); Hiroaki Sakai, Shizuoka (JP); Masaru Shimura, Shizuoka (JP); Takeshi Kawamura, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/912,556

(22) Filed: Jul. 26, 2001

(65) Prior Publication Data

US 2002/0041767 A1 Apr. 11, 2002

(30) Foreign Application Priority Data

Jul. 31, 2000 (JP) ...................................... 2000-232312

(51) Int. Cl.[7] ......................... C03G 15/00; C03G 15/02

(52) U.S. Cl. ............................. 399/43; 399/44; 399/50; 399/176

(58) Field of Search ............................. 399/43, 44, 50, 399/174, 176

(56) References Cited

U.S. PATENT DOCUMENTS

| | | | | | |
|---|---|---|---|---|---|
| 5,420,671 | A | * | 5/1995 | Kisu et al. | 399/50 |
| 5,606,399 | A | * | 2/1997 | Kikui | 377/44 X |
| 5,678,129 | A | * | 10/1997 | Yasuda et al. | 399/50 |
| 5,749,022 | A | * | 5/1998 | Kikui et al. | 399/44 |
| 5,966,558 | A | * | 10/1999 | Kikui | 399/44 |
| 6,014,530 | A | * | 1/2000 | Tsunemi | 399/50 X |

FOREIGN PATENT DOCUMENTS

| | | | |
|---|---|---|---|
| JP | 2-195366 | * | 8/1990 |
| JP | 8-160680 | * | 6/1996 |
| JP | 9-190143 | * | 7/1997 |

* cited by examiner

*Primary Examiner*—Fred L Braun
(74) *Attorney, Agent, or Firm*—Fitzpatrick, Cella, Harper & Scinto

(57) ABSTRACT

An image forming apparatus includes a process cartridge detachably mountable with respect to the main body of the apparatus. The process cartridge is provided with an image bearing member, a charger for charging the image bearing member, a power supply for applying an alternating current voltage to the charger, and a controller for variably controlling the alternating current supplied from the power supply to the charger in conformity with information about the use situation of the process cartridge. The process cartridge can also include an image bearing member, a charger for charging the image bearing member, the charger permitting an alternating current voltage to be applied thereto by a power supply, and a memory for storing therein information about the use situation of the process cartridge, and information of a plurality of preset control values for an alternating current supplied from the power supply to the charger to be variably controlled in conformity with the information.

36 Claims, 16 Drawing Sheets

IMAGE FORMING APPARATUS AND PROCESS CARTRIDGE FOR APPLYING AN ALTERNATING CURRENT TO A CHARGING MEMBER OR CHARGING MEANS FOR CHARGING AN IMAGE BEARING MEMBER

BACKGROUND OF THE INVENTION

1. Field of the Invention

This invention relates to an image forming apparatus for forming an image by the electrophotographic process or the like, and a process cartridge detachably mountable with respect to the main body of the image forming apparatus.

Here, the term "image forming apparatus" covers, for example, an electrophotographic copier, an electrophotographic printer (such as an LED printer or a laser beam printer), an electrophotographic facsimile apparatus, an electrophotographic word processor, etc.

Also, the process cartridge refers to at least one of charging means, developing means and cleaning means, and an electrophotographic photosensitive member which is an image bearing member integrally made into a cartridge, which is made detachably mountable with respect to the main body of the image forming apparatus.

2. Related Background Art

An electrophotographic image forming apparatus such as an electrophotographic copier or a laser beam printer, as is well known, uniformly charges an electrophotographic photosensitive member as an image bearing member by the use of charging means, and thereafter applies light corresponding to image information to the surface thereof to thereby form an electrostatic latent image thereon, and supplies a developer to this latent image by the use of developing means to thereby visualize it, and transfers this visualized image to a recording medium, and thereafter permanently fixes it on the recording medium by a fixing device. The recording medium on which the image has been thus fixed is discharged out of the apparatus, and the electrophotographic photosensitive member after the transfer is cleaned by cleaning means.

In such an image forming apparatus, for the purpose of achieving the simplicity of the interchange and maintenance of expendables such as the electrophotographic photosensitive member and the developer, there is a process cartridge system for integrating the electrophotographic photosensitive member, developing means, charging means and cleaning means as process means for acting on the electrophotographic photosensitive member, and further a developer containing container, a waste developer container for containing therein the developer collected from the electrophotographic photosensitive member, etc., as a process cartridge, and making the process cartridge detachably mountable with respect to the main body of the image forming apparatus.

According to this process cartridge system, the maintenance of the apparatus can be done by a user himself without resorting to a serviceman, and the operability of the apparatus can be markedly improved and therefore, this system is widely used in electrophotographic image forming apparatuses.

As described above, the image forming process in the electrophotographic image forming apparatus includes, for example, the step of uniformly charging the surface of an electrophotographic photosensitive member (photosensitive drum) made into a cylindrical shape as a rotary member to predetermined potential.

As one of charging means, there is a method of bringing a roller-shaped charging member (hereinafter referred to as the "charging roller") as a rotary member into contact with the surface of the photosensitive drum, and applying to this charging roller a voltage comprising an alternating current bias superimposed upon a direct current bias. Also, in order to obtain the stable charging of the surface of the photosensitive drum at that time, it has been empirically found that it is good to make the discharge current amount between the charging roller and the photosensitive drum equal to or greater than a predetermined value.

FIG. 17 of the accompanying drawings shows the waveforms of the voltage and current of an alternating current bias applied to the charging roller. When an output voltage as shown in FIG. 17A, i.e., an alternating current bias (Vo), is applied to the charging roller, as shown in FIG. 17B, an electric current of the same phase as this alternating current bias (Vo), i.e., a resistive load current (Izr) flowing to the resistive load between the charging roller and the photosensitive drum, an electric current advanced by 90° in phase than the alternating current bias (Vo), i.e., a capacity load current (Izc) flowing to the capacity load between the charging roller and the photosensitive drum, and an electric current flowing in a pulse-like fashion during the voltage amplitude peak of the alternating current voltage (Vo), i.e., the discharge current (Is) between the charging roller and the photosensitive drum, flow. Generalizing these, an electric current (Io) of a waveform shown in FIG. 17C flows (total output current). When an alternating current drawn from the charging roller into a high voltage power supply is detected, there is obtained a detected current waveform (Im) of a waveform as shown in FIG. 17D.

FIG. 18 shows the relation between the output current and the amplitude of an alternating current bias (output voltage) applied to the charging roller. It is seen that as the amplitude of the output voltage is gradually increased, the amplitude of the voltage and the output current are substantially proportional to each other for a predetermined voltage amplitude. This is because the resistive load current (Izr) and the capacity load current (Izc) are proportional to the amplitude of the voltage and the amplitude of the voltage is small and therefore, no discharging phenomenon occurs and the discharge current (Is) does not flow. As the amplitude of the output voltage is further increased, a discharging phenomenon starts at a predetermined voltage amplitude (Vs), and the total output current (Io) also deviates from the proportional relation, and thus flows greatly corresponding to the discharge current (Is).

With a view to make the amount of discharge current between the charging roller and the photosensitive drum equal to or greater than a predetermined amount, and stably charge the surface of the photosensitive drum, there has heretofore been a method of providing current detecting means for detecting an electric current outputted from a high voltage power supply for applying an alternating current voltage to the charging roller at a fixed phase synchronized with the alternating voltage applied to the charging roller, and controlling the alternating current voltage the high voltage power supply applies to the charging means so that the detected current by the current detecting means may assume a predetermined control standard value. That is, the alternating current bias applied to the charging roller is controlled so that the value of an instantaneous carrying current (It) which is the addition value of the discharge current (Is) and the resistive load current (Izr), which is detected at the peak of the alternating current bias (output voltage) applied to the charging roller, may become constant.

More specifically, as shown, for example, in FIG. 19 of the accompanying drawings, a high voltage power supply 40 as voltage applying means for applying a voltage to the charging roller has a high voltage transformer drive circuit 41 and a high voltage transformer 42, and a high voltage direct current generation circuit 43 is connected thereto. Further, current detection means 44, a phase detection circuit 45 and a comparing circuit 46 which constitute current detection means 47 are connected to the high voltage power supply 40. The high voltage power supply 40 receives a clock pulse from a printer control portion (not shown) by the high voltage transformer drive circuit 41 and makes a sine wave. Then, an alternating current component is boosted by the high voltage transformer 42, and this high voltage alternating current and a high voltage direct current generated by the high voltage direct current generation circuit 43 are both applied to the charging roller 20 to thereby charge the surface of the photosensitive drum 1. At this time, an electric current detected by the current detection means 44 and phase information detected by the phase detection circuit 45 are inputted to the comparing circuit 46 to thereby detect the instantaneous carrying current (It) during the positive peak voltage or the negative peak voltage of the alternating current voltage. An alternating current bias applied to the charging roller 20 is controlled so that the value of the detected instantaneous carrying current (It) may become constant.

The above-described controlling method according to the prior art, however, has suffered from the following problem.

For example, in an electrophotographic image forming apparatus of the process cartridge type, a process cartridge is repeatedly used for image formation from the initial state in which the image formation has been started, whereby from the initial stage of use until a predetermined developed sheet number is reached, the stains formed by a toner, which is a developer, paper powder, etc., adhere to a charging roller. Also, the film thickness of the surface of the photosensitive drum is decreased with an increase in the developed sheet number.

The resistive load current (Izr) of the charging roller and the photosensitive drum is varied chiefly by these two factors. In this case, images are repeatedly formed, whereby as shown in FIG. 5 of the accompanying drawings, the discharge current contributing to charging is fluctuated by the stain of the charging roller and the decrease in the film thickness of the photosensitive drum. That is, image formation is repeatedly effected from the initial state (state A), whereby the stains formed by a toner, etc., first adhere to the charging roller and resistance rises and therefore, the resistive load current (Izr) becomes small and the discharge current (Is) rises (state B). On the other hand, when the stains on the charging roller are saturated, the scraping of the photosensitive drum decreases the film thickness of the surface thereof and resistance becomes small and therefore, the resistive load current Izr becomes great and the discharge current (Is) decreases (state C).

It is not preferable for the discharge current to fluctuate (increase or decrease) as described above. That is, when the discharge current (Is) between the charging roller and the photosensitive drum increases, the scraping of the photosensitive drum increases and the film thickness of the surface thereof is decreased, thus remarkably shortening the service life of the photosensitive drum. On the other hand, when the discharge current (Is) decreases, defective images such as so-called sandy images are caused by bad charging.

SUMMARY OF THE INVENTION

Accordingly, it is an object of the present invention to provide an image forming apparatus and a process cartridge which can suppress any increase or decrease in the discharge current between charging means and an image bearing member by the stains of the charging means and the wear and tear of the image bearing member, and can form stable images for a long period of time.

It is another object of the present invention to provide an image forming apparatus and a process cartridge which can suppress the fluctuation of the amount of discharge current between charging means and an image bearing member due to the stains, environment, etc., of the charging means, and can extend the service life of the image bearing member and obtain a stable quality of image for a long period of time.

It is another object of the present invention to provide an image forming apparatus and a process cartridge which can suppress any increase in the discharge current between charging means and an image bearing member at the initial stage of the use of the charging means and the image bearing member and can suppress any decrease in the discharge current in the vicinity of the service life of the image bearing member.

It is another object of the present invention to provide an image forming apparatus and a process cartridge which can suppress any increase or decrease in the discharge current between charging means and an image bearing member from the turning on of the power supply of the apparatus until a predetermined time elapses.

It is another object of the present invention to provide an image forming apparatus and a process cartridge which can suppress any increase or decrease in the discharge current between charging means and an image bearing member in conformity with each process cartridge mounted with respect to the main body of the apparatus, and can form stable images for a long period of time in conformity with the characteristic of each process cartridge.

Further objects and features of the present invention will become more apparent from the following detailed description when read with reference to the accompanying drawings.

DESCRIPTION OF THE PREFERRED EMBODIMENTS

An image forming apparatus and a process cartridge according to the present invention will hereinafter be described in greater detail with reference to the drawings.

Embodiment 1

Figure 1:
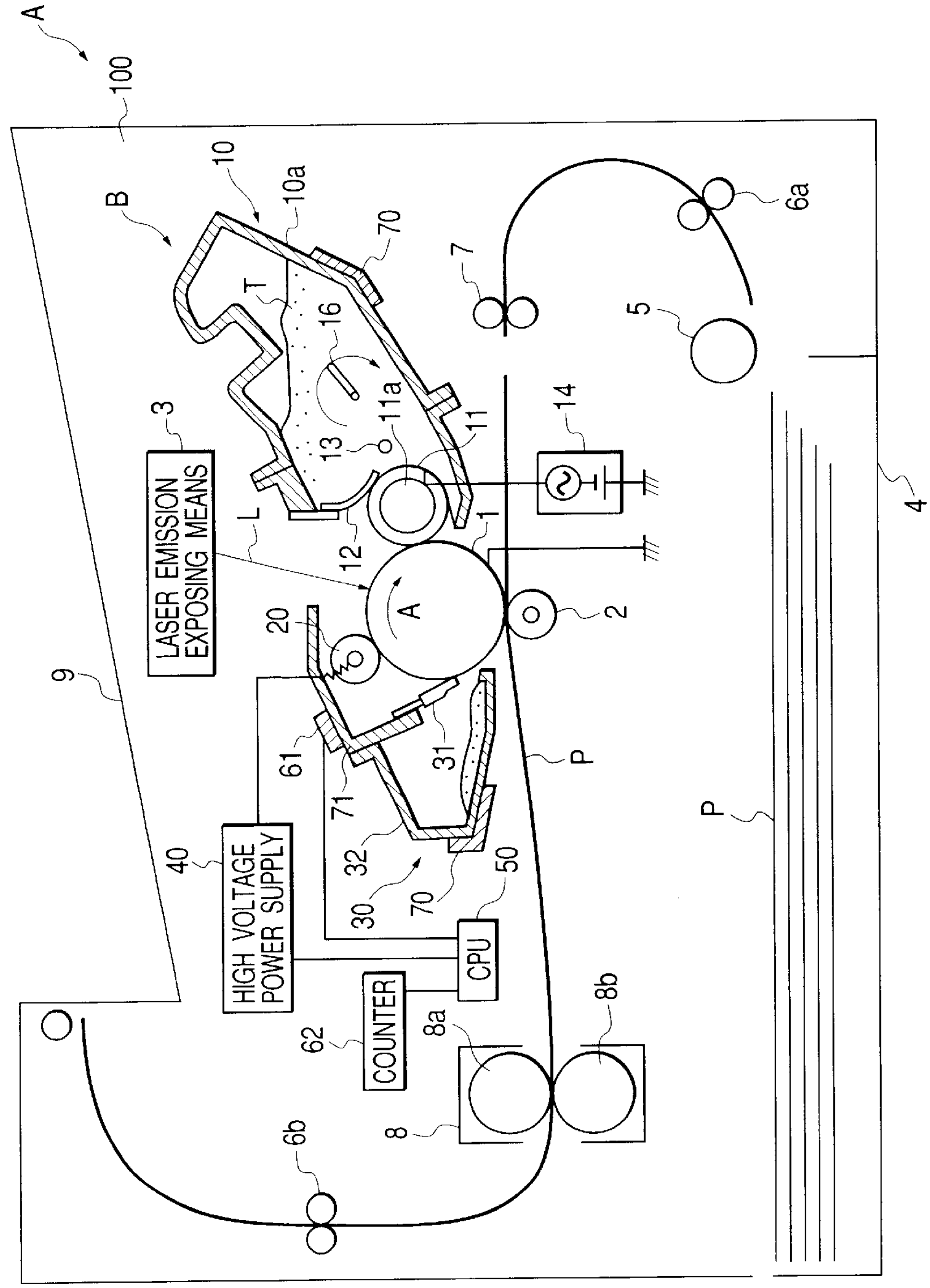
FIG. 1 is a schematic cross-sectional view showing an embodiment of an electrophotographic image forming apparatus with respect to which a process cartridge according to the present invention is detachably mountable.
Figure 2:
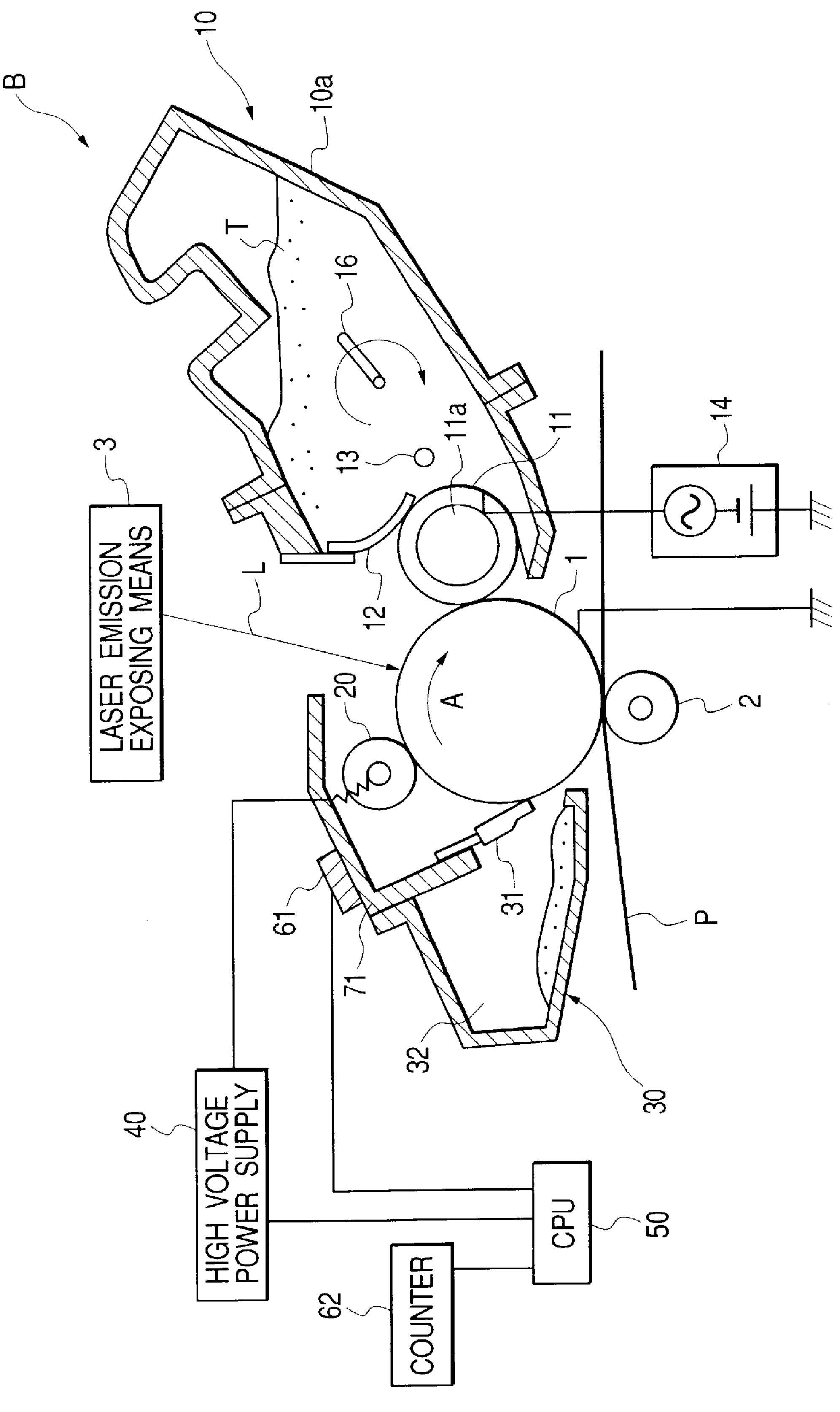
FIG. 2 is a schematic enlarged cross-sectional view of the vicinity of the process cartridge in the electrophotographic image forming apparatus of FIG. 1.

Reference is first had to FIGS. 1 and 2 to describe an embodiment of an electrophotographic image forming apparatus with respect to which a process cartridge constructed in accordance with the present invention is mountable. In this embodiment, the image forming apparatus is a laser beam printer (printer) A which receives image information from a host computer or the like and forms an image on a recording medium such as recording paper, an OHP sheet or a fabric by an image forming process. Also, the printer A of the present embodiment permits a process cartridge B to be detachably mounted with respect thereto.

The printer A has, substantially centrally thereof, a cylindrical photosensitive member which is a rotary member, i.e., a photosensitive drum 1, as an image bearing member. The photosensitive drum 1 is rotated in the direction of arrow A, and has its surface uniformly charged by a charging member formed into a roller shape as a rotary member, i.e., a charging roller 20, provided in charging means which will be described later. Thereafter, the uniformly charged surface of the photosensitive drum 1 is scanned by and exposed to a laser beam L applied from laser emission exposing means 3 in conformity with the image information, and an electrostatic latent image conforming to the image information is formed on the photosensitive drum 1. This latent image is then visualized as a toner image by a developing device 10 supplying a developer thereto.

In the present embodiment, the developing device 10 contains a magnetic monocomponent toner (toner) T as a developer in a developer container 10*a*. In the present embodiment, as the toner T, use is made of one consisting of styrene acrylic resin as a main component and silica extraneously added thereto and having an electrical resistance within a range of about $10^{10}$ to $10^{11}$ Ω. A developing roller 11 as a developer bearing member opposed to the photosensitive drum 1 and rotatable in non-contact therewith is provided in the opening portion of the developer container 10*a*. A magnet 11*a* for holding the toner T on the peripheral surface of the developing roller 11 and carrying it to a developing area is fixed in the developing roller 11. The toner T is agitated by a developer agitating member 16 provided in the developer container 10*a* and is carried to the developing roller 11. The toner T held on the peripheral surface of the developing roller 11 has imparted thereto a predetermined charging amount by the friction thereof with the rotating developing roller 11 and with a developer layer thickness regulating member 12 disposed in contact with the developing roller 11. Then, a voltage comprising an alternating current bias and a direct current bias superimposed upon each other as a developing bias is supplied from a developing bias power supply 14 to the developing roller 11 to thereby produce a potential difference between the developing roller 11 and the electrostatic latent image on the photosensitive drum 1, and the toner T is shifted from the developing roller 11 onto the electrostatic latent image. Thus, a toner image conforming to the image information is formed on the photosensitive drum 1.

On the other hand, recording media P contained in a cassette 4 as recording medium containing means are conveyed one by one to registration rollers 7 through conveying rollers 6*a* as recording medium conveying means. The registration rollers 7 convey the recording medium P to a transferring position in which the photosensitive drum 1 and a transferring roller 2, which is transferring means, are opposed to each other, in synchronism with the formation of the toner image on the photosensitive drum 1.

The toner image on the photosensitive drum 1 developed by the toner T is transferred to the recording medium P conveyed to the transferring position, by the transferring roller 2. Thereafter, the recording medium P is conveyed to a fixing device 8, where the toner T is permanently fixed. The fixing device 8 performs the fixing action by heating and pressurizing the recording medium P by a fixing roller 8*a* provided with heating means and a driving roller 8*b*. The recording medium P on which the image has been fixed is discharged onto a discharge tray 9 provided on the upper portion of the apparatus through conveying rollers 6*b* as recording medium conveying means, etc.

The residual toner T on the photosensitive drum 1 after the toner image has been transferred to the recording medium P is removed by a cleaning member 31, which is in the form of a blade provided in a cleaning device 30, and is accumulated in a cleaning container 32.

In the present embodiment, as shown in FIG. 2, the photosensitive drum 1 and the charging roller 20, the developing device 10 and the cleaning device 30 as process means for acting on the photosensitive drum 1 are coupled together by a frame 71 or the like, and are integrally constructed as a process cartridge B. This process cartridge B is detachably mountable with respect to the main body 100 of the image forming apparatus by a user for the purpose of interchange due to the end of the service life thereof. The process cartridge B is detachably mounted with respect to the main body 100 of the apparatus through cartridge mounting means 70 (FIG. 1) provided in the main body 100 of the image forming apparatus.

The process cartridge B of the present embodiment is provided with a non-volatile memory (first storage means) 61 capable of reading and writing as storage means. It is to be understood that the memory 61 contains therein cartridge side information transmitting means for controlling the reading and writing of information on the memory side. When the process cartridge B is mounted with respect to the main body 100 of the image forming apparatus, the cartridge side information transmitting means of the memory 61 and the information transmitting means of the main body 100 side of the image forming apparatus (main body side information transmitting means) are rendered capable of communicating with each other, and as will be described later in detail, a CPU (central processing unit) 50 as control means provided in the main body 100 of the image forming apparatus is rendered capable of reading and writing information relative to the memory 61. In the present embodiment, the CPU 50 itself contains therein a storage portion (second storage means) as storage means.

The storage means usable in the present invention is not particularly restrictive, but an electronic memory formed by an ordinary semiconductor, such as a combination of a non-volatile memory or a volatile memory and a backup battery can be used without particular limitation. If for example, a non-contact memory for effecting data communication between storage means and a reading-out/writing-in IC by an electromagnetic wave is used as the storage means provided in the process cartridge B, the cartridge side information transmitting means and the main body side information transmitting means may be in non-contact with each other and therefore, the possibility of the bad contact by the mounted state of the process cartridge B is eliminated and control of high reliability can be effected.

Figure 3:
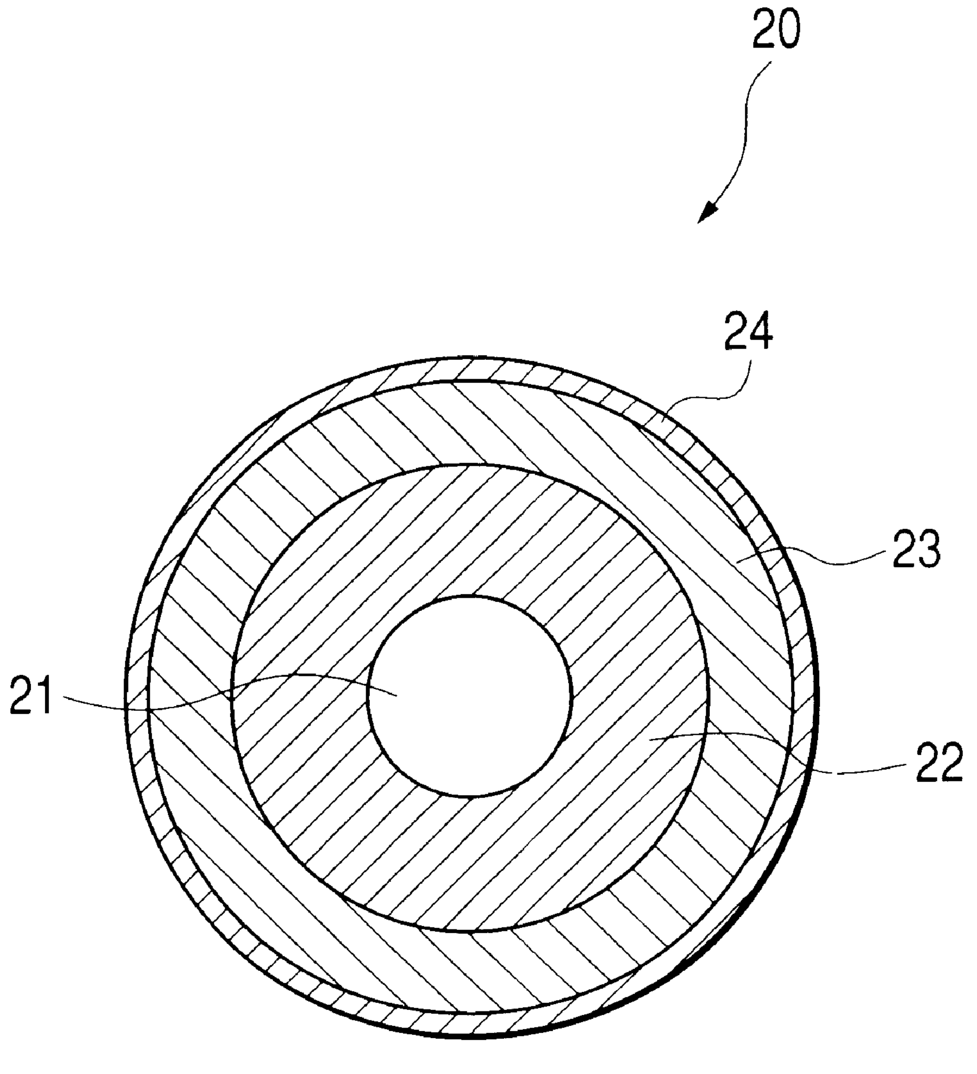
FIG. 3 is a schematic cross-sectional view showing an example of the construction of a charging roller.

The charging means used in the printer A of the present embodiment will now be further described. In the present embodiment, the charging roller 20 is brought into pressure contact with the photosensitive drum 1 with a predetermined pressure force, and is driven to rotate with the rotation of the photosensitive drum 1. The charging roller 20 used in the present embodiment, as shown in FIG. 3, is provided with a mandrel 21 and a roll base body covering it. The base material 22 is an electrically conductive rubber layer comprising EPDM (ethylene-propylene-diene terpolymer compound) and an electrically conductive agent dispersed therein. Also, as a resistance layer 23, use is made of one comprising hydrin rubber and an electrically conductive agent dispersed therein and the base material 22 is covered with this resistance layer 23, and further the surface is protected by a protective layer 24 comprising toresin and an electrically conductive agent dispersed therein. The charging roller 20 has resistance of $10^5$ to $10^6$ Ω, and in the present embodiment, it is characterized in that its resistance is lowered by a temperature rise.

A voltage comprising an alternating current bias superimposed on a direct current bias is applied to the mandrel 21 of the charging roller 20 by a high voltage power supply 40, which is voltage applying means. In order to stably charge the surface of the photosensitive drum 1, control is effected so as to make the discharge current amount between the charging roller 20 and the photosensitive drum 1 equal to or greater than a predetermined value.

Figures 17A, 17B, 17C, 17D:
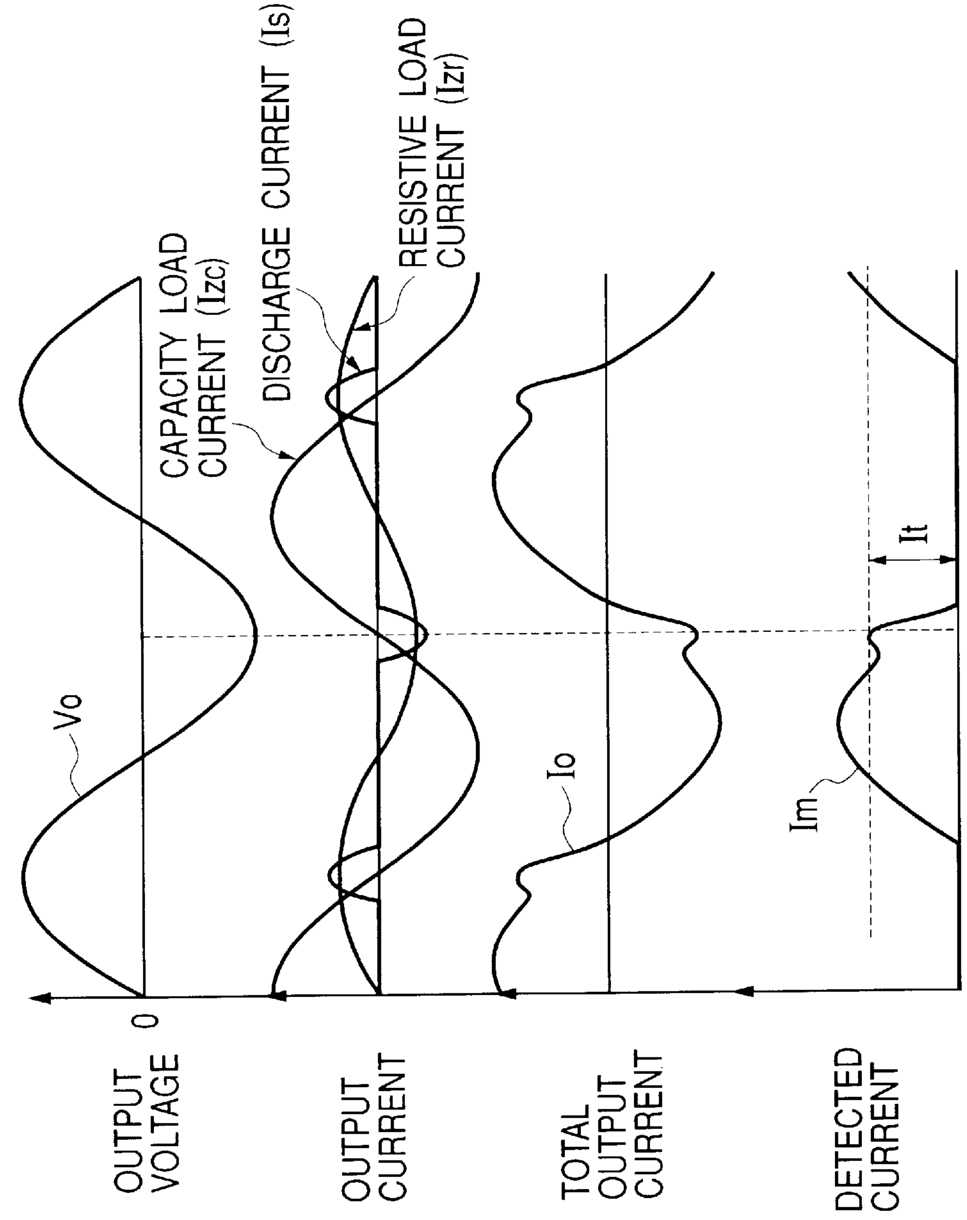
FIGS. 17A, 17B, 17C and 17D are graphs for illustrating the voltage applied to the charging roller and an electric current flowing at that time.
Figure 18:
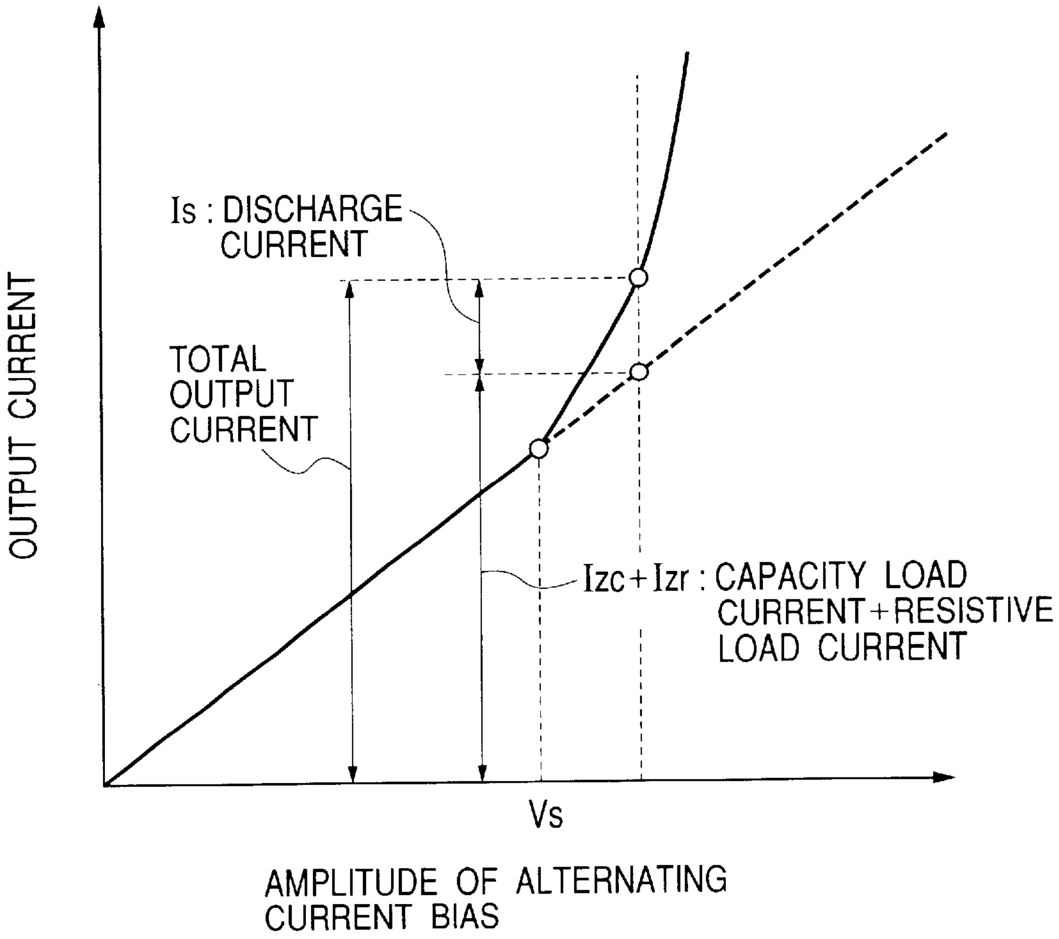
FIG. 18 is a graph showing an example of the relation between the amplitude of an alternating current bias applied to the charging roller and the electric current flowing at that time.
Figure 19:
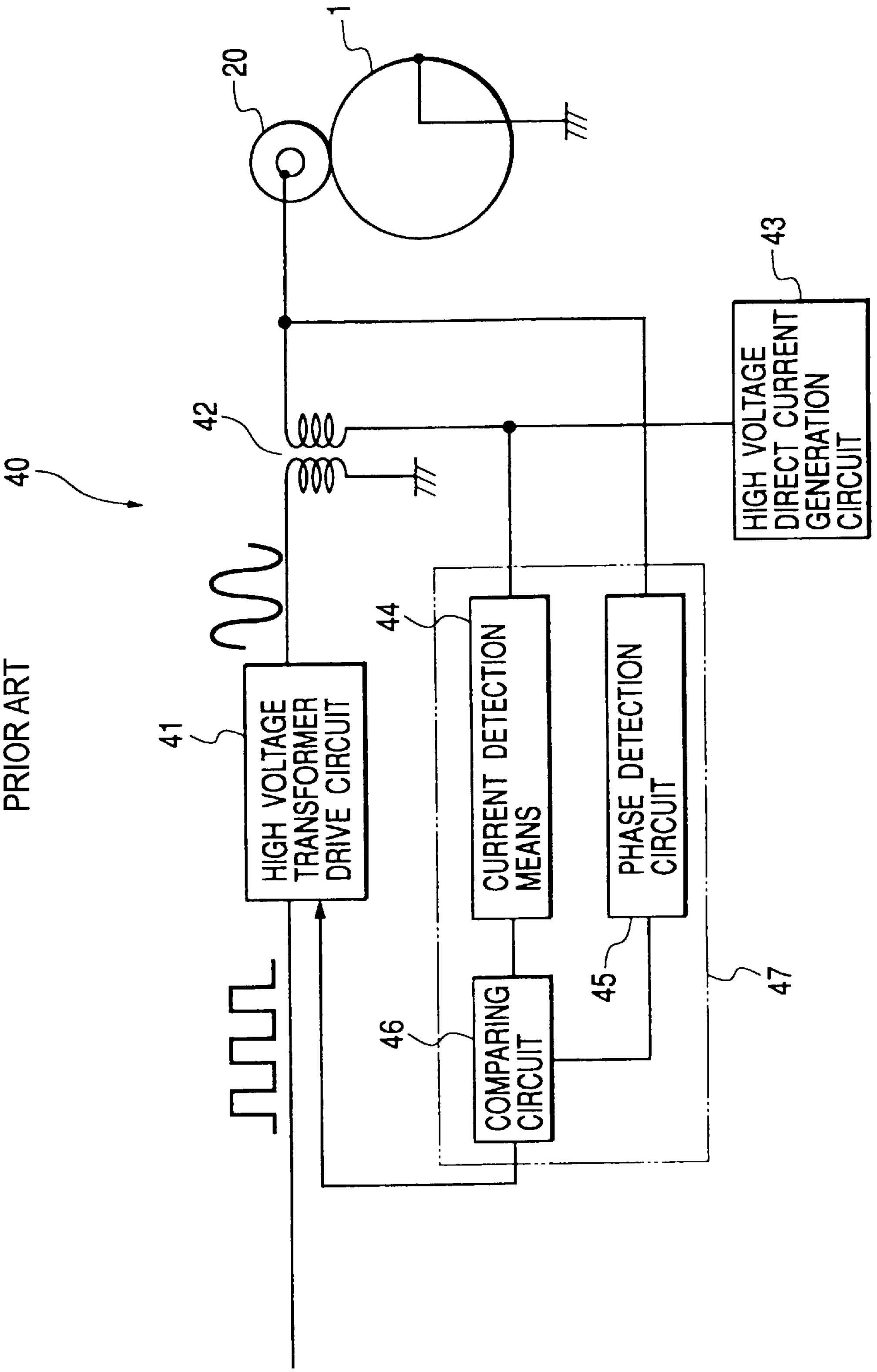
FIG. 19 PRIOR ART
FIG. 19 is a schematic diagram for illustrating a control circuit for a voltage applied to a charging roller according to the prior art.

That is, in the present embodiment, substantially similarly to the above-described example of the prior art, a voltage comprising an alternating current bias and a direct current bias superimposed upon each other and controlled so that the value (FIG. 17D) of an instantaneous carrying current (It) detected during the peak of the output voltage may become constant at a predetermined value is applied to the mandrel 21 of the charging roller 20. As will be described later in detail, in the present embodiment, unlike the prior art, the set value (control reference value) of the above-mentioned instantaneous carrying current (It) has two stages so as to be capable of being changed over.

A method of controlling the voltage applied to the charging roller 20 will now be described in greater detail.

Figure 4:
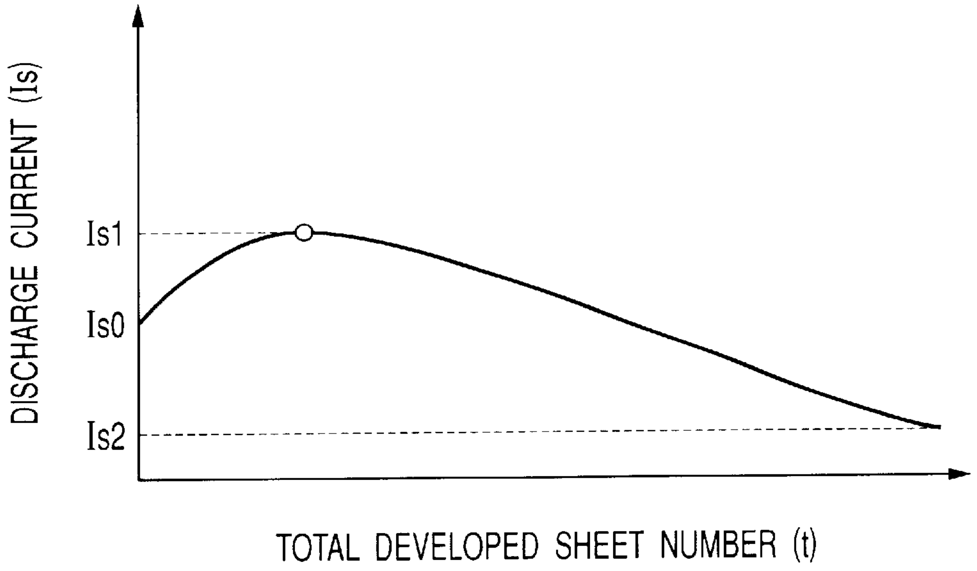
FIG. 4 is a graph for illustrating an example of the transition of the amount of discharge current (Is) accompanying image formation.
Figure 5:
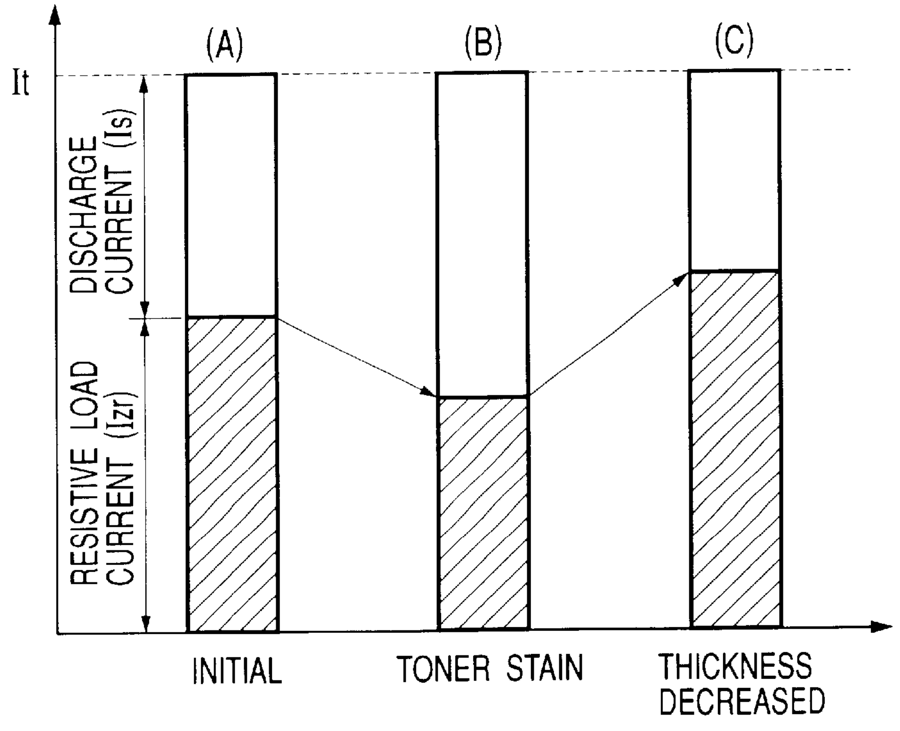
FIG. 5 is a graph for illustrating an example of the transition of the amount of discharge current (Is) accompanying image formation.

A description will first be provided of a case where in the construction of the printer A of the present embodiment, a voltage is applied to the charging roller 20 by the use of a conventional controlling method. In this case, the transition of the discharge current (Is) relative to the developed sheet number (or image forming sheet number) (t) has a characteristic as shown in FIG. 4. As will be understood if reference is made also to FIG. 5, image formation is repeatedly effected from the initial state, i.e., from immediately after a fresh process cartridge B is started to be used (FIG. 5; state A), whereby the stains formed by the toner, etc., first adhere to the charging roller 20 and the resistance of the roller rises. Therefore, the resistive load current (Izr) becomes small and the discharge current (Is) rises (FIG. 5; state B). On the other hand, when the charging roller 20 is saturated with stains, the film thickness of the photosensitive drum 1 is decreased by the scraping thereof and the resistance becomes small and therefore, the resistive load current (Izr) becomes great and the discharge current (Is) is decreased (FIG. 5 state C).

When the discharge current (Is) is decreased, defective images such as so-called sandy images are caused by the bad charging of the photosensitive drum 1 and therefore, heretofore generally, the discharge current at the initial stage has been set to a high value in order to bring the discharge current (Is) in the vicinity of the service life of the photosensitive drum 1 to a level (Is2) (FIG. 4) at which no bad image is caused.

However, the degree of wear and tear, i.e., the amount of scraping (or shaving), of the photosensitive drum 1 is affected by the above-mentioned discharge current (Is). That is, in the present embodiment, the photosensitive drum 1 as an image bearing member is constructed with an organic photoconductor (OPC) layer as a photosensitive layer formed on the outer peripheral surface of a drum base made of aluminum (OPC photosensitive member). The organic photoconductor (OPC) layer of the photosensitive drum 1 has chiefly two layers, i.e., a CT layer (charge transporting layer) and a CG layer (charge generating layer). Particularly, in the photosensitive drum 1 which is such an OPC photosensitive member, the service life of the photosensitive drum 1 generally depends on a decrease (scraping) in the thickness of the CT layer, and as this thickness is decreased, the quality of image is lowered, but the amount of scraping of this photosensitive drum 1 is effected by the charging process, and particularly, the discharge current, and when the discharge current (Is) is increased, the amount of scraping of the photosensitive drum 1 is increased and thus, the service life of the photosensitive drum is remarkably shortened.

Accordingly, it has heretofore posed the problem of the shortened service life of the photosensitive drum 1 to preset the initial discharge current (Is0) to a high value in order to obtain a discharge current (Is2) in the vicinity of the service life of the photosensitive drum 1. Further, with image formation, the discharge current exhibits the transition as described above (FIG. 4) and therefore, as the developed sheet number is increased, the discharge current (Is) rises from Is0 to Is1 and therefore, the scraping of the photosensitive drum 1 becomes great.

So, in the present embodiment, in the use of the process cartridge B, the increase in the discharge current amount at an early stage is suppressed and the control of changing over the set value of the instantaneous carrying current (It) is effected so that no bad image may occur at the latter half of the stage.

Figure 6:
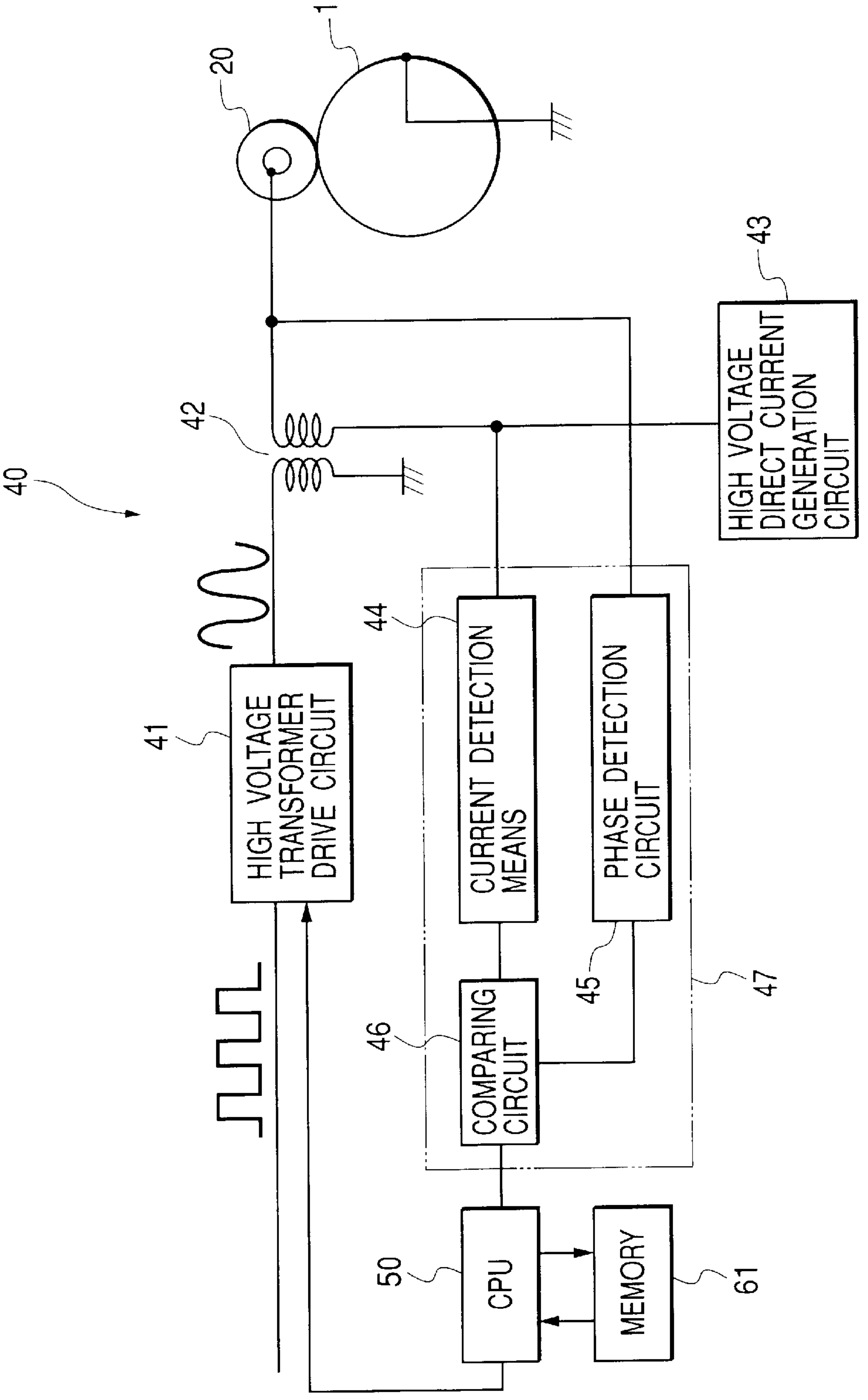
FIG. 6 is a schematic diagram for illustrating an embodiment of a control circuit for a voltage applied to the charging roller.

Further describing with reference also to FIG. 6, in the present embodiment, the high voltage power supply 40 has a high voltage transformer drive circuit 41 and a high voltage transformer 42, and has a high voltage direct current generation circuit 43 connected thereto. Further, current detection means 44, a phase detection circuit 45 and a comparing circuit 46 constituting current detection means are connected to the high voltage power supply 40.

The high voltage power supply 40 receives a clock pulse from a printer control portion (not shown) by the high voltage transformer drive circuit 41 and makes a sine wave. Then, an alternating current component is boosted by the high voltage transformer 42, and this high alternating current voltage and a high direct current voltage generated by the high voltage direct current generation circuit 43 are both applied to the charging roller 20. Provision is made of current detection means 47 for detecting an electric current outputted from the high voltage power supply 40 at a fixed phase synchronized with the alternating current voltage applied to the charging roller 20 at this time. That is, the current detection means 47 inputs the electric current detected by the current detection means 44 and phase information detected by the phase detection circuit 45 to the comparing circuit 46 to thereby detect the instantaneous carrying current (It) (FIG. 17D) during the positive peak voltage or the negative peak voltage of the high alternating current voltage.

The applied charging voltage is controlled so that the value of the thus detected instantaneous carrying current (It) may become constant at a predetermined control reference value, and in the present embodiment, as the use situation of the process cartridge B, with the total developed sheet number (t) as an index, the control of changing over the set value (control reference value) of the instantaneous carrying current (It) in conformity with the use situation of the process cartridge B is effected.

We have studied the transition of the value of the discharge current (Is) relative to the total (or integrated) developed sheet number (t) as shown in FIG. 4 and as the result, have found that in the printer A of the present embodiment, by the set value of the instantaneous carrying current (It) being changed over at the changeover timing shown in Table 1 below, any increase in the discharge current (Is) at the early stage of the use of the process cartridge B can be suppressed and even in the vicinity of the service life of the photosensitive drum 1, the discharge current (Is) can be kept at a level which will not cause a deflective image. That is, in the present embodiment, the set value of the instantaneous carrying current (It) is determined (It0) so that the discharge current (Is0) at the initial stage may become equal to a discharge current (Is2) at a level at which no bad image occurs, and at a point in time at which the discharge current (Is) has decreased with image formation, the set value of the instantaneous carrying current (It) is raised (It1) so as to raise the discharge current (Is).

TABLE 1

| | | |
|---|---|---|
| total developed sheet number(t) (sheets) | 0 | 10000 |
| instantaneous carrying current (It)($\mu$A) | 300(It0) | 400(It1) |

In the present embodiment, the information (changeover conditions) of a plurality of control reference values shown in Table 1, i.e., the changeover timing and the set value of the instantaneous carrying current (It) are prestored in a storage portion (second storage means) contained in the CPU 500 of the main body 100 of the image forming apparatus.

Also, the printer A of the present embodiment has counter means 62 for estimating (integrating) the developed sheet number as means for detecting the use situation of the process cartridge B, and the counter means 62 inputs a detection signal to the CPU 50 each time an image is formed on a recording medium P. As a result, the CPU 50 writes the developed sheet number into the memory (first storage means) 61 of the process cartridge B at any time and renews it, and causes it to be stored as the total developed sheet number (t).

The CPU 50 compares the current total developed sheet number (t) read out of the memory 61 with the changeover timing (the total developed sheet number during the changeover) of the set value of the instantaneous carrying current (It) to thereby control the changeover of the plurality of set values of the instantaneous carrying current (It) provided in advance, and sets it as the control reference value of the alternating current bias of the high voltage power supply 21. Thus, the CPU 50 controls the charging bias applied from the high voltage power supply 40 to the charging roller 20 so that the instantaneous carrying current (It) detected by the comparing circuit 46 may become constant at this set value.

Figure 7:
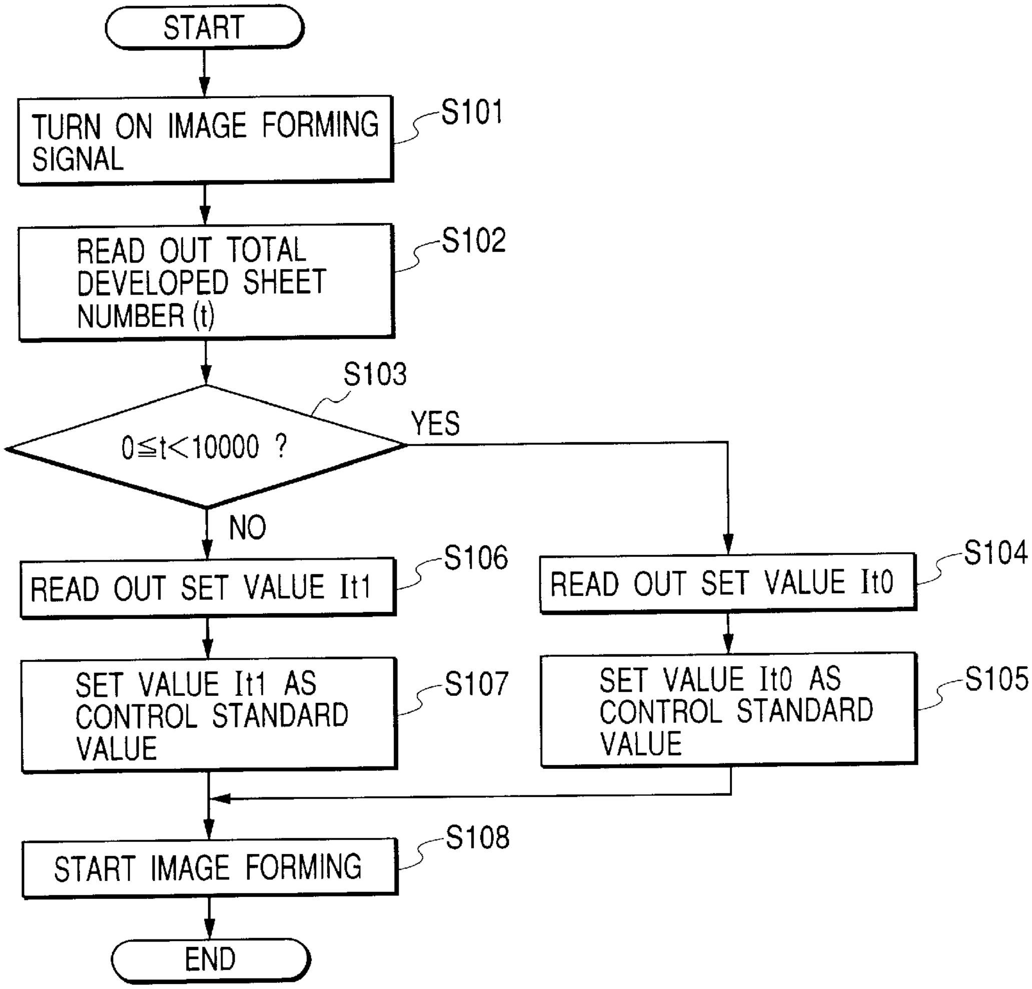
FIG. 7 is a flow chart showing an embodiment of a procedure for changing over the set value of an instantaneous carrying current (It) according to the present invention.

Reference is now made to the flow chart of FIG. 7 to describe the procedure of changing over the set value of the instantaneous carrying current (It) in the present embodiment.

First, when the image forming instructions by the user (operator) are generated (the image forming signal is ON) (S101: step 101), the CPU 50 reads the total developed sheet number (t) stored in the non-volatile memory 61 as the storage means carried in the process cartridge B (S102).

So, the CPU 50 compares the changeover conditions for the instantaneous carrying current (It) shown in Table 1 with the current total developed sheet number (t) (S103), and when the total developed sheet number (t) is equal to or greater than 0 and less than 10,000, the CPU 50 reads out It0 (300 $\mu$A) which is the set value of the instantaneous carrying current (It) stored in the storage portion of the CPU 50 (S104), and sets it as the control resistance value of the alternating current bias of the high voltage power supply 40 (S105), and starts image formation (S108).

On the other hand, when at S103, the total developed sheet number (t) is judged to be equal to or greater than 10,000, the CPU 50 reads out It1 (400 $\mu$A) which is the set value of the instantaneous carrying current (It) stored in the CPU 50 (S106), and sets it as the control reference value of the alternating current bias of the high voltage power supply 40 (S107), and starts image formation (S108).

Figure 8:
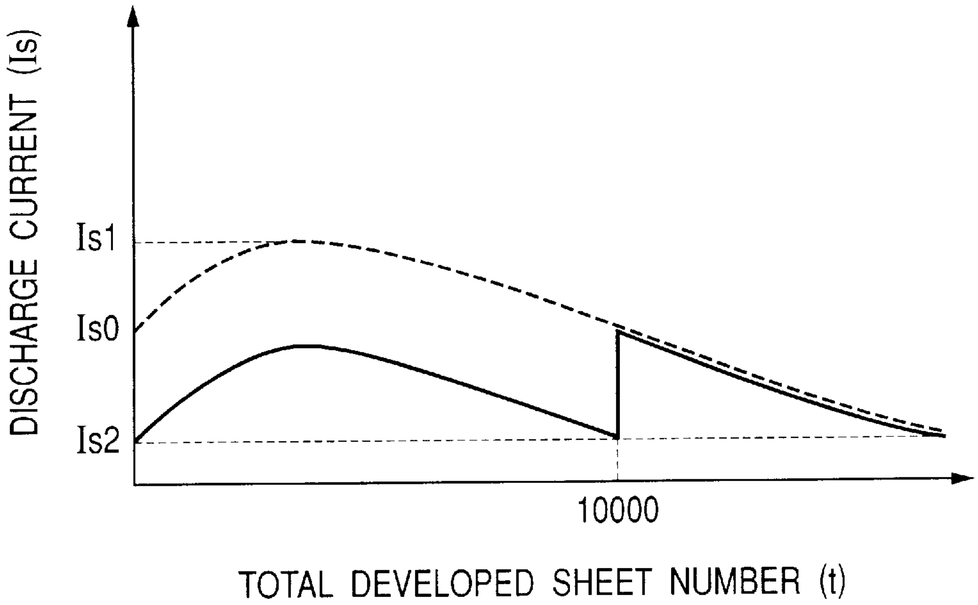
FIG. 8 is a graph for illustrating an example of the transition of the discharge current (Is) accompanying image formation when controlled in accordance with the present invention.

By adopting the construction as described above, in the printer A of the present embodiment, the transition of the discharge current (Is) becomes such as indicated by solid line in FIG. 8. In FIG. 8, the transition of the discharge current when the charging bias is controlled by the conventional controlling method is also indicated by broken line.

That is, as is apparent from FIG. 8, according to the control of the present embodiment, the discharge current (Is) between the charging roller 20 and the photosensitive drum 1 which greatly affects the service life of the photosensitive drum 1 is not increased at the initial stage of use of the process cartridge B, and the increase in the discharge current (Is) accompanying the image formation can also be minimized, and this leads to the excellent effect of extending the service life of the photosensitive drum 1. Further, a discharge current amount (It) at a level at which no bad image occurs even in the vicinity of the service life of the photosensitive drum 1 can be obtained and therefore, a stable quality of image is obtained for a long period of time. According to the present embodiment, as compared with the conventional charging bias controlling method, there has been obtained the effect of extending the service life of the photosensitive drum 1 by about 1.2 times.

Also, as regards the information about the use situation of the process cartridge B, in the present embodiment, the total developed sheet number is stored in the memory (first storage means) 61 provided in the process cartridge B, whereby the information about the use situation can be retained in the process cartridge B itself and therefore, for example, even when before the end of its service life, the process cartridge B is detached from the main body 600 of the image forming apparatus and interchanged with other process cartridge B, the set value of the instantaneous carrying current (It) can be changed over always accurately in conformity with the inherent use situation of the process cartridge B mounted with respect to the main body 100 of the image forming apparatus to thereby control the voltage applied to the charging roller 20.

While in the present embodiment, the total developed sheet number has been used as the index indicative of the use situation of the process cartridge B, and more particularly of the charging roller 20 and the photosensitive drum 1, the present invention is not restricted thereto. That is, any index having a correlation with the fluctuation of the discharge current (Is) between the charging roller 20 and the photosensitive drum 1 can be utilized without any particular limitation. For example, the total (or integrated) charging time for which the alternating current bias has been applied to the charging roller 20, the total (or integrated) rotation time of the photosensitive drum 1, etc., can be suitably used, and there is obtained an effect similar to that when the above-mentioned total developed sheet number is utilized. In this case, as means for detecting the use situation of the process cartridge B, provision can be made of means for finding the above-mentioned total charging time and the total rotation time of the photosensitive drum 1, and the timing at which the set value of the instantaneous carrying current (It) is changed over can be suitably set by the total charging time and the total rotation time instead of the above-mentioned total developed sheet number. Also, the total charging time multiplied by a coefficient $k_1$ and the total rotation time multiplied by a coefficient $k_2$ may be totaled and the result may be used as an index indicative of the use situation of the process cartridge.

Figure 9:
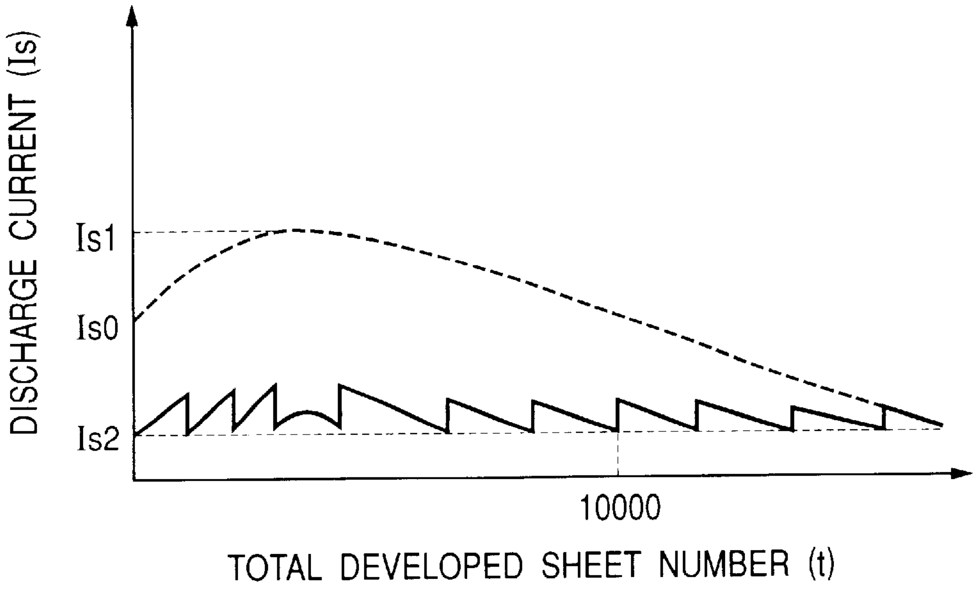
FIG. 9 is a graph for illustrating another example of the transition of the amount of discharge current between the charging roller and a photosensitive drum accompanying image formation when controlled in accordance with the present invention.

Also, the present invention is not restricted to the changeover timing of the instantaneous carrying current (It) and the set value of the instantaneous carrying current (It) used in the present embodiment, but these changeover conditions of the set value of the instantaneous carrying current (It) can be suitably set by the apparatus to which the present invention is applied. Accordingly, while in the present embodiment, the set value of the instantaneous carrying current (It) has been described as being changed over in two stages, the present invention is not restricted thereto, but for example, the set value of the instantaneous carrying current (It) can be provided at three or more stages and the discharge current (Is) can be kept more constant in the vicinity of a discharge current (Is2) at a level at which no bad image occurs (FIG. 9). As a result, there is obtained the effect of further extending the service life of the photosensitive drum 1.

Further, while in the present embodiment, the design is made such that the set value of the instantaneous carrying current (It) is prestored in the storage portion (second storage means) of the CPU 50 of the main body 100 of the image forming apparatus, this may be stored in the memory (first storage means) 61 carried on the process cartridge B. By doing this, during the shipping of the process cartridge B, it becomes possible to store a set value adjusted to the characteristics of the charging roller 20 and the photosensitive drum 1, and it becomes possible to cut down the margin at the changeover set value of the instantaneous carrying current (It), and this is preferable. Also, it is possible to cope with some change in the design of the process cartridge B, and more particularly of the charging roller 20 and the photosensitive drum 1, and this is convenient. As a result, the increase or decrease in the discharge current (Is) can always be suppressed accurately in conformity with each process cartridge B mounted with respect to the main body 100 of the apparatus, and there can be obtained the effect of further extending the service life of the photosensitive drum 1 in conformity with the characteristic of each process cartridge B, and it becomes possible to provide a stable quality of image for a long period of time.

As described above, it is preferable that the information about the use situation of the process cartridge B (in the present embodiment, the total developed sheet number (t)) and further, the information of a plurality of control reference values (in the present embodiment, the set value of the instantaneous carrying current (It)) be stored in the memory provided in the process cartridge B, but of course, in the principle of the present invention, the information about the use situation of the process cartridge B and the information of the plurality of control reference values can be stored in any combination mode in the memory 61 provided in the process cartridge B and/or the storage portion of the CPU 50 provided in the main body 100 of the apparatus.

As described above, according to the present embodiment, the image forming apparatus can suppress the fluctuation (increase or decrease) of the discharge current due to the stains of the charging roller 20 and the wear and tear of the photosensitive drum 1 accompanying image formation, and can form stable images for a long period of time. Particularly, the apparatus can suppress the increase in the discharge current at the initial stage of use of the charging roller 20 and the photosensitive drum 1 and can suppress the decrease in the discharge current in the vicinity of the service life of the photosensitive drum 1, and can form stable images for a long period of time.

Embodiment 2

Another embodiment of the present invention will now be described. The image forming apparatus of this embodiment is basically similar in construction to the printer A of Embodiment 1, and differs from the printer A in the method of controlling the voltage applied to the charging means. Accordingly, constructionally and functionally similar elements are given the same reference character and need not be described in detail.

In the present embodiment, the design is made such that the rise of the discharge current (Is) immediately after the turning on of the power supply of the main body 100 of the image forming apparatus is reduced by changing over the instantaneous carrying current (It).

That is, when the process cartridge B is in its initial state or when the power supply of the main body 100 of the image forming apparatus continues to be OFF for a long time and the process cartridge B mounted with respect to the main body 100 of the apparatus is in the room temperature state and thereafter, the power supply is turned on, the discharge current (Is) continues to be in a high state until image formation on a predetermined number of sheets is effected.

The expression that the process cartridge B is in its initial state covers, in present embodiment, the state immediately after a new process cartridge B, so far left in the room temperature state outside the main body 100 of the apparatus, has been mounted with respect to the main body 100 of the apparatus, and in addition, the state immediately after a process cartridge left in the room temperature state outside the main body 100 of the apparatus in the course of use has been mounted with respect to the main body 100 of the apparatus.

Figure 10:
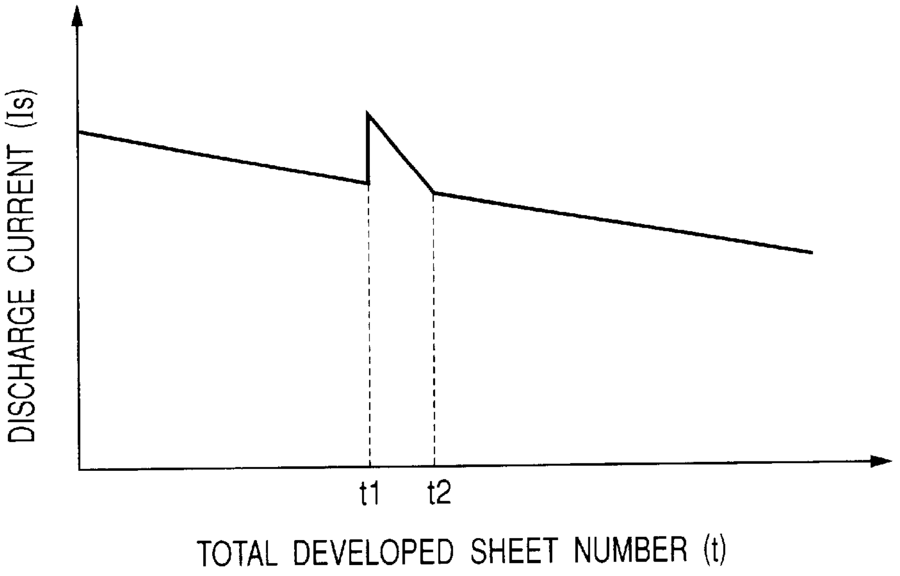
FIG. 10 is a graph for illustrating the fluctuation of the discharge current (Is) in the initial state of the process cartridge or immediately after the turning on of the power supply of the apparatus.

FIG. 10 shows a change in the discharge current (Is) from immediately after the turning on of the power supply until a predetermined number of sheets are printed that occurs when the voltage applied to the charging roller 20 is controlled by the conventional controlling method. In FIG. 10, t1 indicates a state in which the power supply of the main body 100 of the image forming apparatus is turned off for about 12 hours, and thereafter the power supply has been turned on, and at this time, the discharge current (Is) exhibits a value higher than the discharge current aimed at. Thereafter, when the image forming operation for about 500 sheets is terminated (t2), the discharge current transits to a value approximate to the discharge current originally aimed for.

Figure 11:
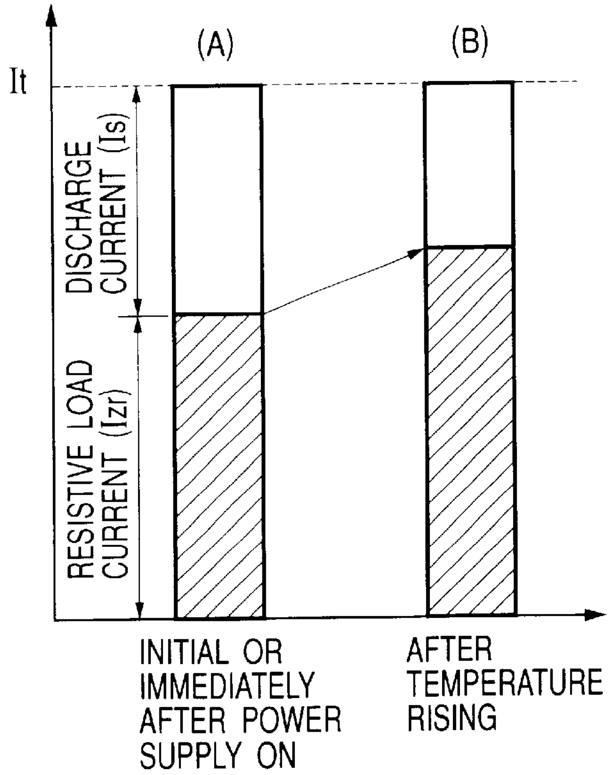
FIG. 11 is a graph for illustrating the fluctuation of the discharge current (Is) in the initial state of the process cartridge or immediately after the turning on of the power supply of the apparatus.

This is because from the temperature (usually room temperature) in the initial state of the process cartridge B or immediately after the closing of the power supply switch of the main body 100 of the apparatus, a temperature rise of the charging roller 20 and the photosensitive drum 1 occurs due to image formation being repeatedly effected. That is, as will be understood if reference is made also to FIG. 11, in the initial state of the process cartridge B or in the room temperature state immediately after the turning on of the power supply, the resistance between the charging roller 20 and the photosensitive drum 1 is great and therefore, the resistive load current (Izr) becomes small and the discharge current (Is) assumes a great value (FIG. 11; state A). Thereafter, the resistance between the charging roller 20 and the photosensitive drum 1 is decreased by the temperature rise of the charging roller 20 and the photosensitive drum 1 and therefore, the resistive load current (Izr) becomes great and the discharge current (Is) is decreased (FIG. 11; state B), and when image formation on a predetermined number of sheets is effected, the discharge current (Is) assumes a desired value.

When as described above, the discharge current (Is) is increased in the initial state of the process cartridge B or immediately after the turning on of the power supply of the main body 100 of the apparatus, the scraping of the surface of the photosensitive drum 1 is expedited, and this does not have preferable effect on the service life of the photosensitive drum 1.

So, in the present embodiment, the design is made such that the alternating current voltage applied to the charging means is controlled by the different set value (control reference value) of the instantaneous carrying current (It) for a predetermined time after the power supply of the main body 100 of the apparatus has been turned on. By the set value of the instantaneous carrying current (It) being thus changed over, the increase in the discharge current as described above immediately after the turning on of the power supply of the main body 100 of the apparatus is prevented. That is, according to the present embodiment, as in Embodiment 1, the design is first made such that, as the use situation of the process cartridge B, with the total developed sheet number (t) as an index, the set value of the instantaneous carrying current (It) is changed over in conformity therewith, and the design is further made such that as the predetermined time from immediately after the turning on of the power supply of the main body 100 of the apparatus, with the total developed sheet number (t') from after the turning on of the power supply of the main body 100 of the apparatus as an index, the set value of the instantaneous carrying current (It) is changed over in conformity therewith.

A control system for the voltage applied to the charging roller 20 in the present embodiment is substantially similar to that shown in FIG. 6, but in the present embodiment, the total developed sheet number (t') from immediately after the ON of the power supply of the main body 100 of the apparatus is further stored in the storage portion (second storage means) of the CPU 50 of the main body 100 of the image forming apparatus. The total developed sheet number (t') from after the ON of the power supply is resettable by the ON/OFF of the power supply of the main body 100 of the apparatus. Counter means for obtaining the total developed sheet number (t') from after the ON of the power supply may be provided by the counter means 61 used for the detection of the total developed sheet number (t) or may be provided discretely therefrom.

In the present embodiment, the set value of the instantaneous carrying current (It) changed over in conformity with the total developed sheet number (t) and the total developed sheet number (t') from after the turning on of the power supply and the changeover timing thereof follow Table 2 below.

TABLE 2

| total developed sheet number (t) | 0 | | 10,000 | |
|---|---|---|---|---|
| total developed sheet number from after power supply on (t') | 0 | 500 | 0 | 500 |
| instantaneous carrying current (It)($\mu$A) | 280 (It0') | 300 (It0) | 380 (It1') | 400 (It1) |

In the present embodiment, the information of the plurality of control reference values shown in Table 2 (changeover conditions), i.e., the changeover timing and the set value of the instantaneous carrying current (It), are prestored in the storage portion (second storage means) contained in the CPU 50 of the main body 100 of the image forming apparatus.

This set value, as in Embodiment, can also be stored in the non-volatile memory 61 as storage means carried on the process cartridge B, whereby as described above, control conforming to each process cartridge B can conveniently be effected.

Figure 12:
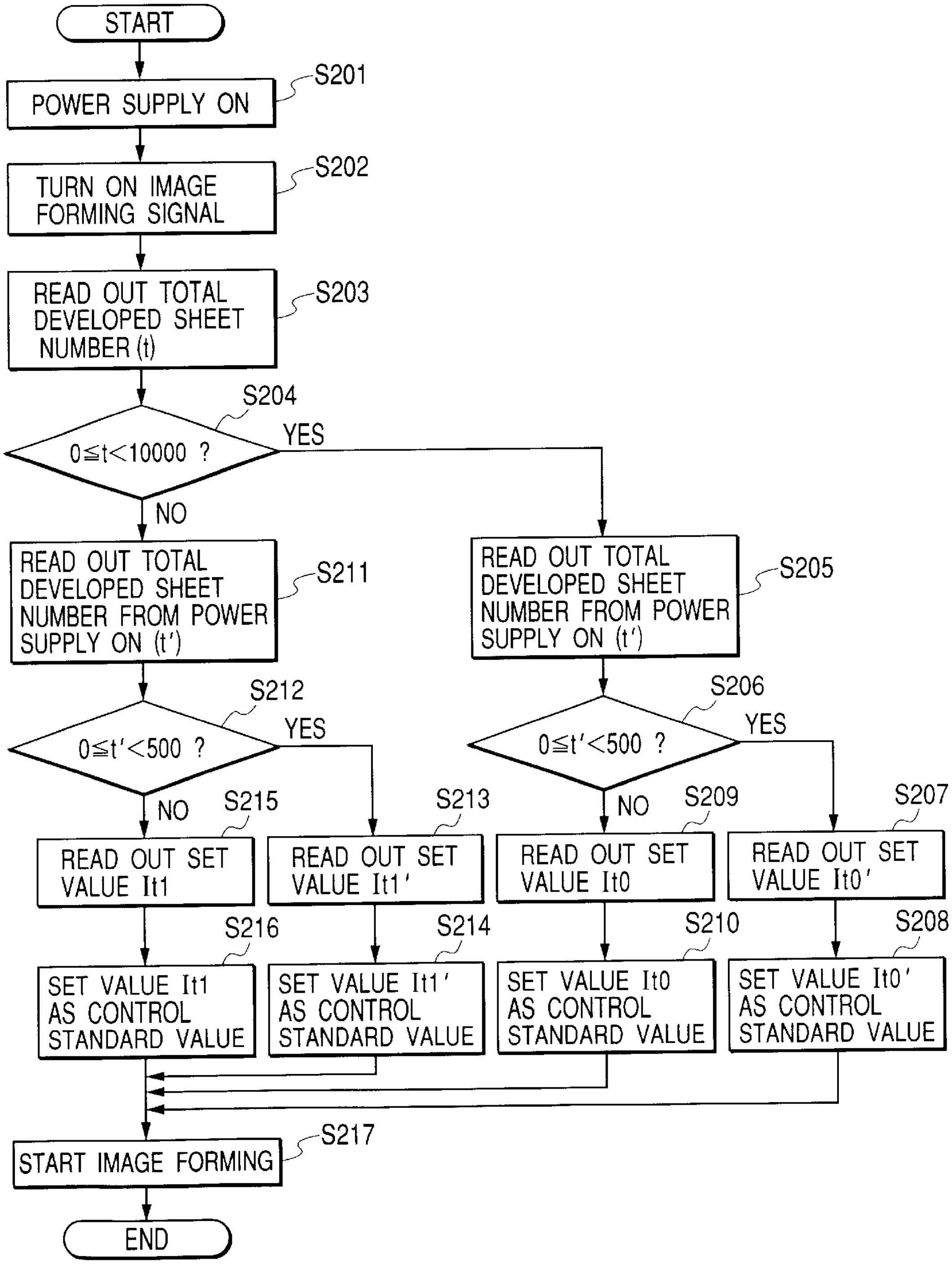
FIG. 12 is a flow chart showing another embodiment of the procedure of changing over the set value of the instantaneous carrying current (It) according to the present invention.

Reference is now made to the flow chart of FIG. 12 to describe the procedure of changing over the set value of the instantaneous carrying current (It) in the present embodiment.

First, the power supply of the main body 100 of the image forming apparatus is turned on (S201: step 201), and when the image forming instructions by the user are generated (image forming signal ON) (S202), the CPU 50 reads the total developed sheet number (t) stored in the non-volatile memory 61 as storage means carried on the process cartridge B (S203).

Thereupon, the CPU 50 compares the total developed sheet number (t) and the changeover conditions of the instantaneous carrying current (It) with each other (S204), and if the total developed sheet number (t) is equal to or greater than 0 and less than 10,000, the total developed sheet number from after power supply on (t') is then read from the storage portion of the CPU 50 (S205). If the total developed sheet number from after power supply on (t') is equal to or greater than 0 and less than 500 (S206), It0' (280 $\mu$A), which is the set value of the instantaneous carrying current (It) stored in the storage portion of the CPU 50, is read out (S207), and is set as the control reference value of the alternating current bias of the high voltage power supply 40 (S208), and image formation is started (S217). On the other hand, if the total developed sheet number from after power supply on (t') is equal to or greater than 500 (S206), It0 (300 $\mu$A), which is the set value of the instantaneous carrying current (It) stored in the storage portion of the CPU 50, is read out (S209), and is set as the control reference value of the alternating current bias of the high voltage power supply 40 (S210), and image formation is started (S217).

Also, if at S204, the total developed sheet number (t) is judged to be equal to or greater than 10,000, the total developed sheet number from after power supply on (t') is then read from the storage portion of the CPU 50 (S211). If the total developed sheet number from after power supply on (t') is equal to or greater than 0 and less than 500 (S212), It1' (380 $\mu$A), which is the set value of the instantaneous carrying current (It) stored in the storage portion of the CPU 50, is read out (S213), and is set as the control reference value of the alternating current bias of the high voltage power supply 40 (S214), and image formation is started (S217). On the other hand, if the total developed sheet number from after power supply on (t') is equal to or greater than 500, It1 (400 $\mu$A), which is the set value of the instantaneous carrying current (It) stored in the storage portion of the CPU 50, is read out (S215), and is set as the control reference value of the alternating current bias of the high voltage power supply 40 (S216), and image formation is started (S217).

In the foregoing description, the use situation of the process cartridge B has been described as detecting the total developed sheet number from immediately after the power supply to the main body 100 of the apparatus, and changing over the set value of the instantaneous carrying current (It) in conformity with the result thereof, but as described above, an increase in the discharge current is also seen when the process cartridge B is in its initial state. Accordingly, the design can be made such that when the process cartridge B left in room temperature in a state in which the power supply of the main body 100 of the apparatus has been turned, on the cartridge is mounted, for example, the instantaneous carrying current (It) is changed over in conformity with the total developed sheet number from after being mounted (t") as a predetermined time from after the process cartridge B has been mounted.

In this case, the set value of the instantaneous carrying current (It) changed over in conformity with the total developed sheet number from after the mounting of the process cartridge B (t") can be provided in advance, and instead of the total developed sheet number from after power supply on (t') reset by the ON/OFF of the power supply of the main body of the apparatus, the total developed sheet number (t") from after the process cartridge is mounted can be stored and used in the storage portion of the CPU 50 provided in the main body 100 of the apparatus. Particularly, the set value of the instantaneous carrying current (It) can also be changed over in conformity with a predetermined time (e.g,. the total developed sheet number) from after a new process cartridge B, having been mounted, is detected and the new process cartridge B has been mounted. As means for detecting the new process cartridge B, use can be made of physical means such as a projection, or means for attaching predetermined information to the memory 61 provided in the process cartridge B and recognizing it.

By adopting the construction as described above, the printer A of the present embodiment can obtain an effect similar to that of Embodiment 1 and further, can suppress any increase or decrease in the discharge current occurring for a predetermined time from immediately after power supply is on, i.e., in the present embodiment, during the time until image formation on a predetermined number of sheets is effected, or when the process cartridge B is in its initial state, and therefore there is the effect of further extending the service life of the photosensitive drum 1, and a stable quality of image is obtained for a long period of time.

Embodiment 3

Still another embodiment of the present invention will now be described. The image forming apparatus of the present embodiment is basically similar in construction to the printer A of Embodiment 1, and differs from the printer A in the method of controlling the voltage applied to the charging means. Accordingly, constructionally and functionally similar elements are given the same reference characters and need not be described in detail.

In the present embodiment, the design is made such that the instantaneous carrying current (It) is variably controlled in conformity with the atmospheric temperature of the process cartridge B.

That is, in the above-described Embodiment 2, as the predetermined time from after the state in which the power supply of the main body 100 of the apparatus has been turned on, the control of changing over the set value of the instantaneous carrying current (It) in conformity with the total developed sheet number from after power supply on (t') has been effected, and we have further studied this situation, with the study of Embodiment 2 taken into account, and as the result, we have found that the increase or decrease in the discharge current (Is) is greatly affected by the atmospheric temperature of the process cartridge B.

Figure 13:
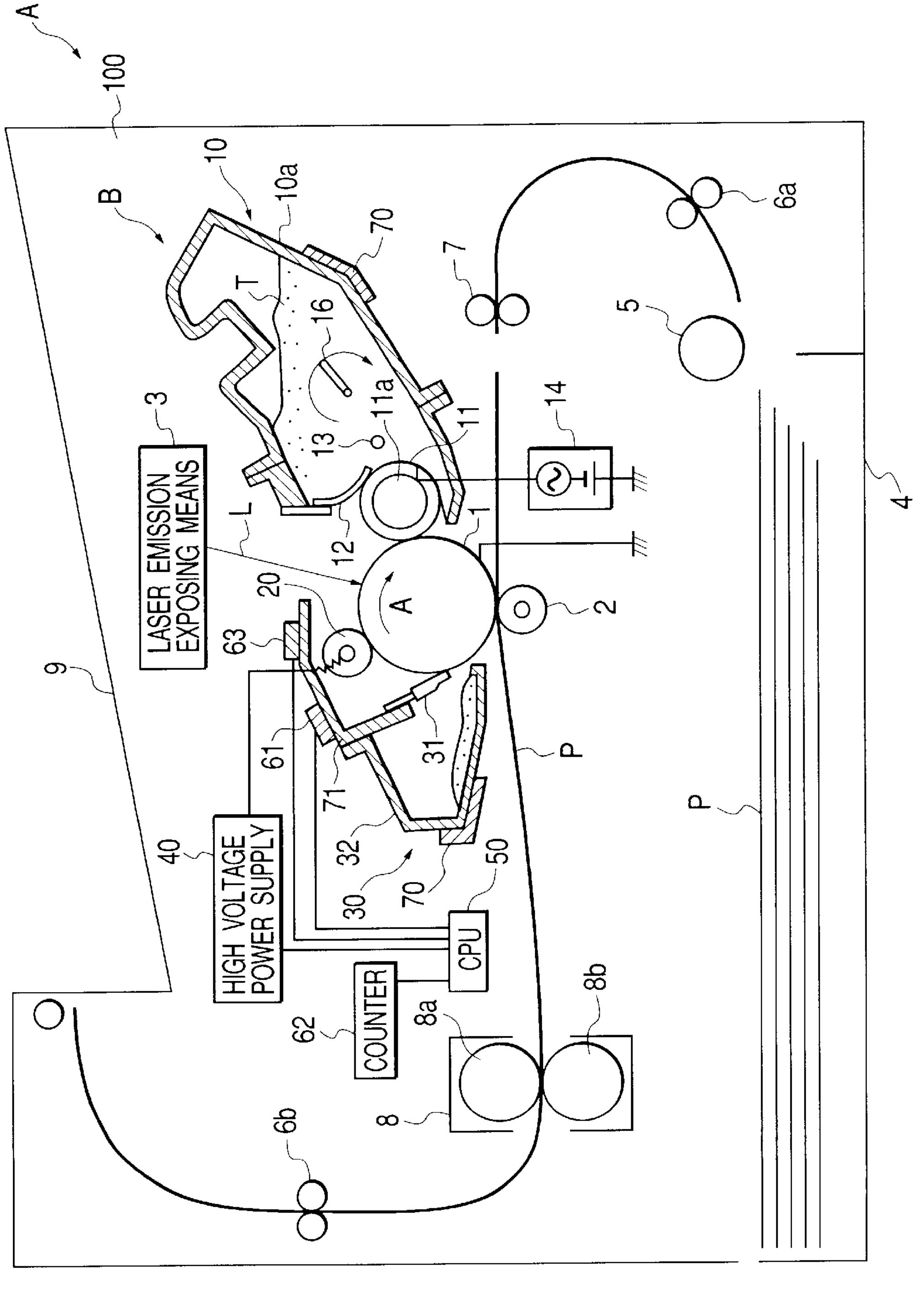
FIG. 13 is a schematic cross-sectional view showing another embodiment of the electrophotographic image forming apparatus with respect to which the process cartridge according to the present invention is detachably mountable.

So, in the present embodiment, as shown in FIG. 13, a temperature sensor 63, which is temperature detecting means, is mounted near the process cartridge B to detect the atmospheric temperature of the process cartridge B. In the present embodiment, the temperature sensor 63 is provided in the main body 100 of the image forming apparatus near the process cartridge B. The output of the temperature sensor 63 is inputted to the CPU 50 and is utilized for the control which will be described later.

It is also possible to provide the temperature sensor 63 on the process cartridge B, and make the communication with the CPU 50 of the main body 100 of the apparatus possible in a state in which the process cartridge B is mounted with respect to the main body 100 of the apparatus.

When as described above, the temperature sensor 63 is provided in the main body 100 of the image forming apparatus, it becomes possible to set the instantaneous carrying current (It) adjusted to the output of the temperature sensor 63 to thereby reduce the increase or decrease in the discharge current (Is) from immediately after the power supply is on until a predetermined time elapses.

Figure 14:
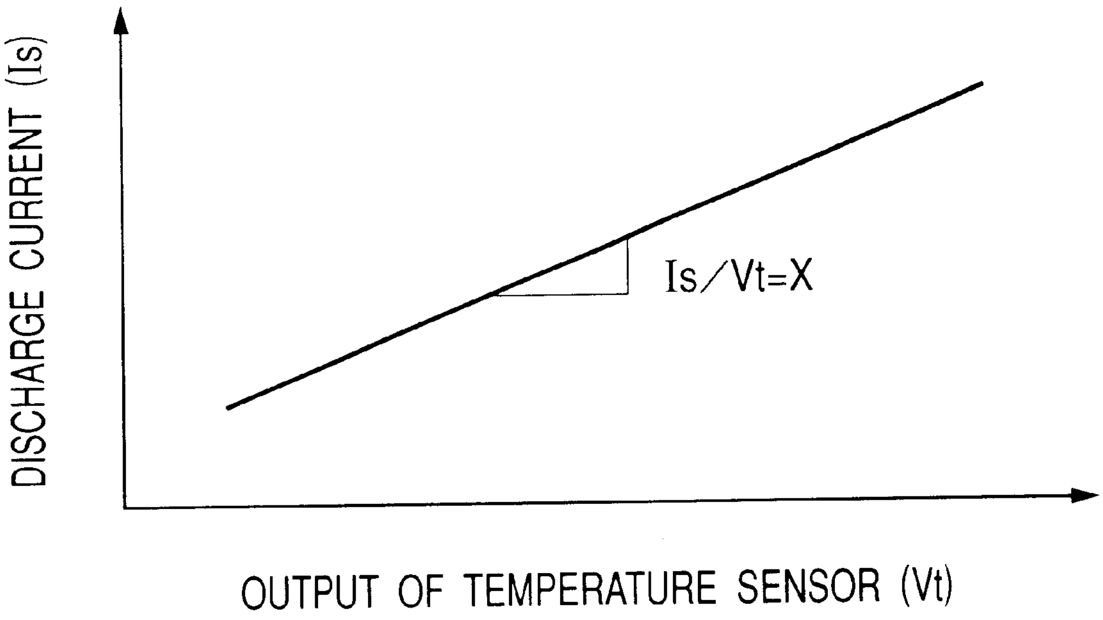
FIG. 14 is a graph showing an example of the relation between the atmospheric temperature and the amount of discharge current (Is).

The relation between the output (Vt) of the temperature sensor 63 and the discharge current (Is) obtained by our study is as shown in FIG. 14. That is, the discharge current (Is) linearly varies relative to the atmospheric temperature of the process cartridge B, i.e., the output (Vt) of the temperature sensor 63.

Accordingly, in the present embodiment, the inclination (Is/Vt=X) of the straight line shown in the graph of FIG. 14 is prestored in the storage portion (second storage means) of the CPU 50 of the main body 100 of the image forming apparatus as information indicative of the correlation between the output of the temperature sensor 63 and the instantaneous carrying current (It) (the control reference value), i.e., the correlation between the atmospheric temperature of the process cartridge B and the control reference value, and with the image forming operation, the set value of the instantaneous carrying current (It) is linearly varied with respect to the atmospheric temperature of the process cartridge B.

In the present embodiment, as in Embodiment 1, as the use situation of the process cartridge B, the set value of the instantaneous carrying current (It) is changed over in conformity with the total developed sheet number (t) and further, from the changed-over set value of the instantaneous carrying current (It), the above-mentioned inclination X and the output (Vt) of the temperature sensor 63, the set value of the instantaneous carrying current (It) is corrected in conformity with the atmospheric temperature of the process cartridge B to thereby find the set value in conformity with the value of the output (Vt) of the temperature sensor 63.

Figure 15:
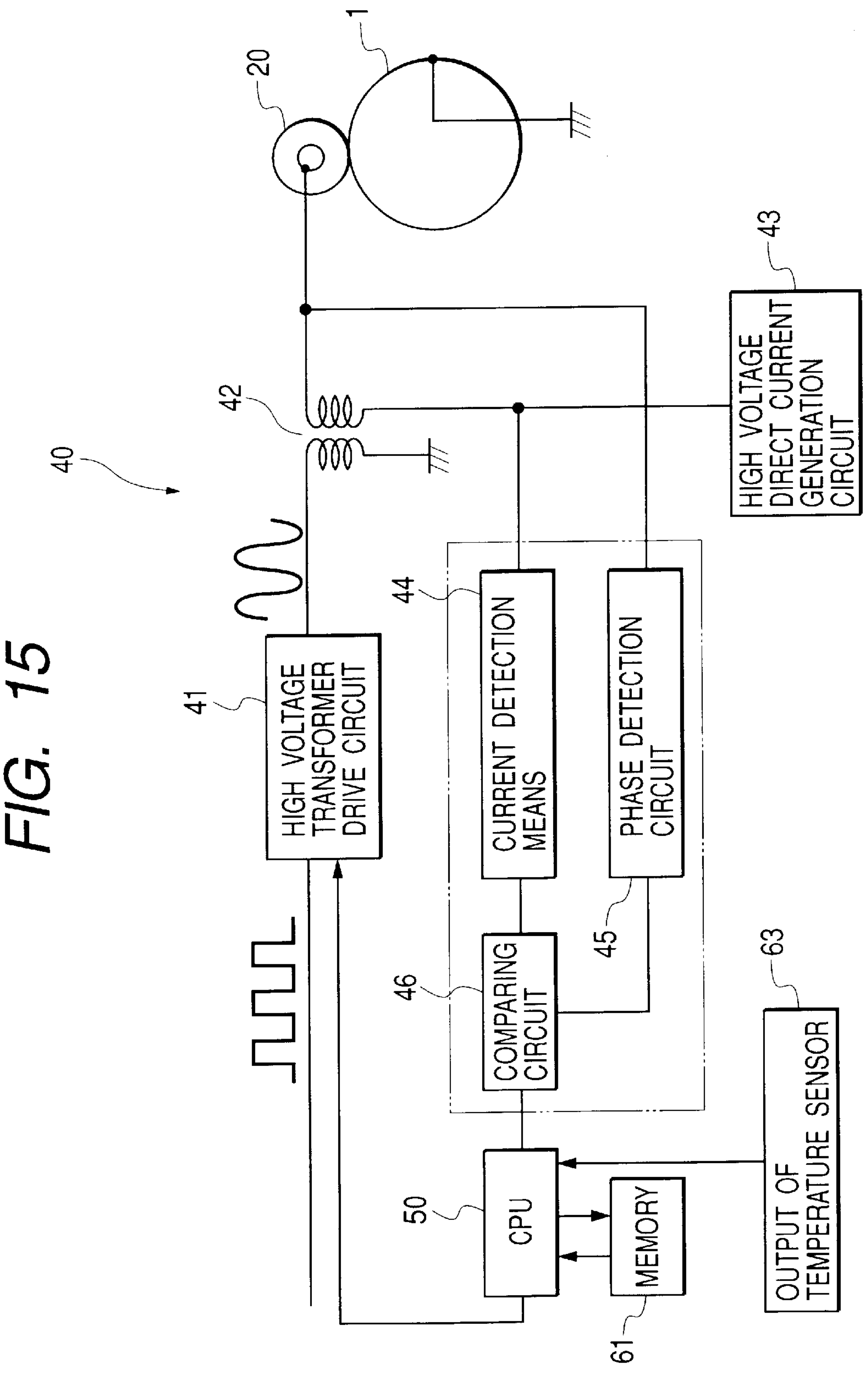
FIG. 15 is a schematic diagram for illustrating another embodiment of the control circuit for the voltage applied to the charging roller.

Further describing the embodiment, as shown in FIG. 15, the high voltage power supply 40 receives a clock pulse from a printer control portion (not shown) by the high voltage transformer drive circuit 41, and prepares a sine wave. Then, the alternating current component is boosted by the high voltage transformer 42, and this high voltage alternating current and a high voltage direct current generated by the high voltage direct current generation circuit 43 are both applied to the charging roller 20. At this time, the electric current detected by the current detection means 44 and the phase information detected by the phase detection circuit 45 are inputted to the comparing circuit 46 to thereby detect the instantaneous carrying current (It) during the positive peak voltage or the negative peak voltage of the alternating current voltage.

Here, first, as in Embodiment 1, the set value (It) stored in the storage portion of the CPU 50 provided in the main body 100 of the apparatus is read in as the set value of the instantaneous carrying current (It) conforming to the total developed sheet number (t). In the present embodiment, the changeover of the set value of the instantaneous carrying current (It) conforming to the total developed sheet number (t) is effected in accordance with Table 1 in Embodiment 1.

The CPU 50 then prepares a control line from the read set value (It) and the information of the inclination X stored in the CPU 50, finds a set value conforming to the value of the output (Vt) of the temperature sensor 63, and sets it as the control reference value of the alternating current bias of the high voltage power supply 40. Then, the CPU 50 controls the high voltage power supply 40 so that the instantaneous carrying current (It) detected by the comparing circuit 46 may become constant at the found set value.

While in the present embodiment, the changeover condition for the set value of the instantaneous carrying current (It) is stored in the storage portion of the CPU 50 provided in the main body 100 of the apparatus, it can also be stored in the non-volatile memory 61 as storage means carried on the process cartridge B, as in Embodiment 1, whereby as described above, control conforming to each process cartridge B can conveniently be effected. Likewise, the inclination information X (=Is/Vt) can also be stored in the memory 61 of the process cartridge B. Thereby, control conforming to the temperature characteristic of each process cartridge B and control conforming to some change in design can conveniently be effected.

While in the present embodiment, the discharge current (Is) and the atmospheric temperature of the process cartridge B are described as being in a linear relation, the present invention is not restricted thereto, but when they are not in a linear relation, instead of the above-mentioned inclination information (X), information representative of the correlation can be found inadvance, for example, as a calculation expression.

Figure 16:
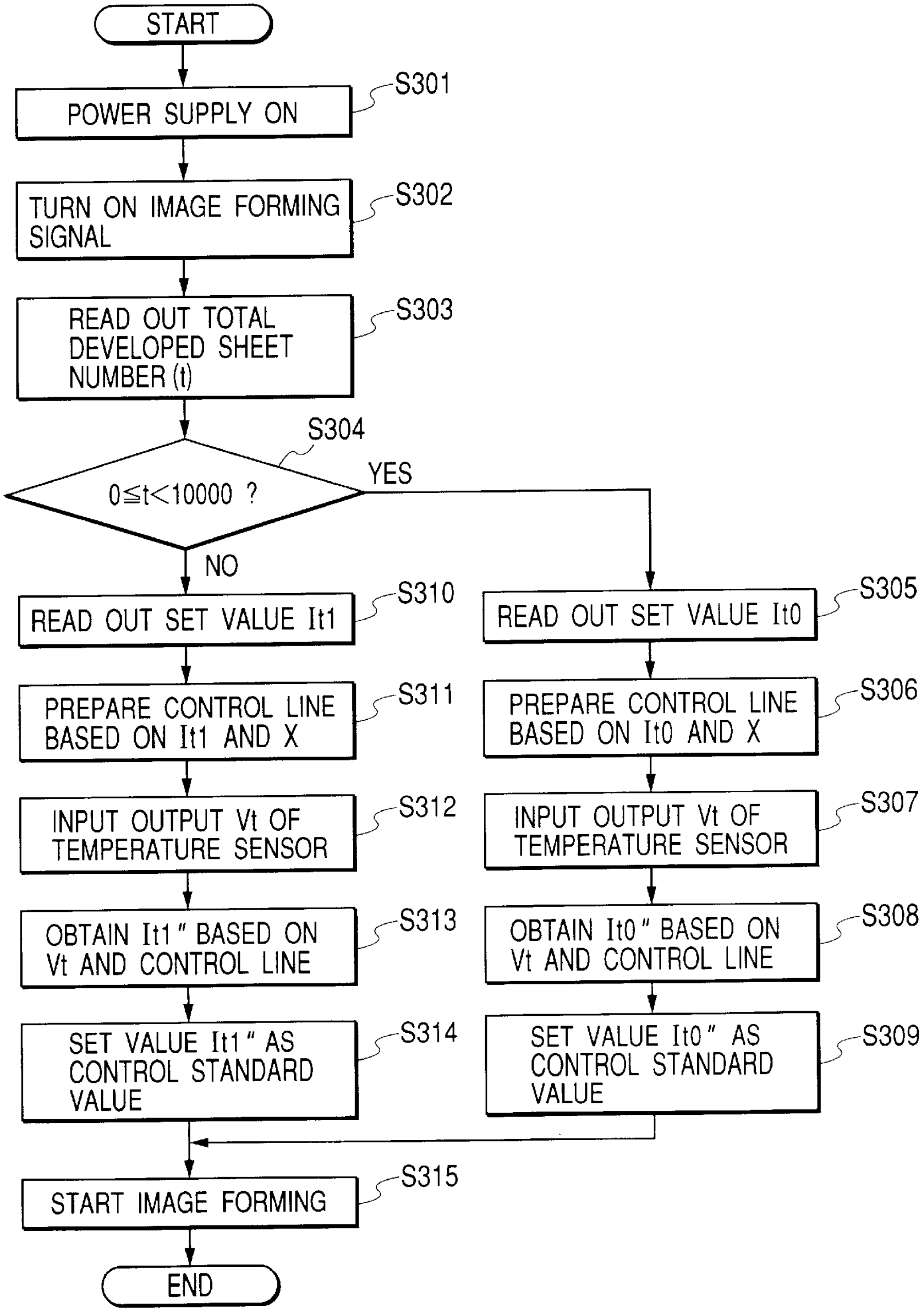
FIG. 16 is a flow chart showing another embodiment of the procedure of changing over the set value of the instantaneous carrying current (It) according to the present invention.

Reference is now made to the flow chart of FIG. 16 to describe the procedure of changing over the instantaneous carrying current (It) in the present embodiment.

First, the power supply of the main body 100 of the image forming apparatus is turned on (S301: step 301), and when the image forming instructions by the user are generated (image forming signal on) (S302), the CPU 50 reads the total developed sheet number (t) stored in the non-volatile memory 61 as storage means carried on the process cartridge B (S303).

Thereupon, the CPU 50 compares the total developed sheet number (t) and the changeover condition for the instantaneous carrying current (It) with each other (S304), and if the total developed sheet number (t) is equal to or greater than 0 and less than 10,000, it reads out It0 (300 $\mu$A), which is the set value of the instantaneous carrying current stored in the storage portion of the CPU 50 (S305). Then, the CPU 50 prepares a control line from the read-out set value (It0) and the inclination information X (FIG. 14) stored in the storage portion of the CPU 50 (S306). Thereafter, the CPU 50 inputs the output (Vt) of the temperature sensor 63 (S307), finds a set value (It0") conforming to the value of the output (Vt) by the use of the control line found at S306 (S308), sets it as the control reference value of the alternating current bias of the high voltage power supply 40 (S309), and starts image formation (S315).

On the other hand, if at S304, it is judged that the total developed sheet number (t) is equal to or greater than 10000, It1 (400 $\mu$A), which is the set value of the instantaneous carrying current (It) stored in the storage portion of the CPU 50, is then read out (S310). Then, the CPU 50 prepares a control line from the read-out set value (It1) and the inclination information X (FIG. 14) stored in the storage portion of the CPU 50 (S311). Thereafter, the CPU 50 inputs the output (Vt) of the temperature sensor 63 (S312), finds a set value (It1") conforming to the value of the output (Vt) by the use of the control line found at S311 (S313), sets it as the control reference value of the alternating current bias of the high voltage power supply 40 (S314), and starts image formation (S315).

By adopting the construction as described above, the printer A of the present embodiment can obtain an effect similar to that of Embodiment 1, and further can suppress the increase in the discharge current in the initial state of the process cartridge B or from immediately after the power supply on until a predetermined time elapses. According to the present embodiment, irrespective of whether the process cartridge B is in its initial state or immediately after the ON of the power supply of the main body 100 of the apparatus, it is possible to change over the set value of the instantaneous carrying current (It) in conformity with the atmospheric temperature of the process cartridge and therefore, the voltage applied to the charging roller 20 can be controlled accurately in conformity with each situation. Thus, according to the present embodiment, there is the effect of the further extending the service life of the photosensitive drum 1, and a stable quality of image can be obtained for a long period of time.

The present invention is not restricted to the above-described embodiments, but all modifications are possible within the scope of the technical idea of the present invention.

What is claimed is:

1. An image forming apparatus comprising:

a process cartridge detachably mountable with respect to a main body of said apparatus, said process cartridge being provided with an image bearing member and charging means for charging said image bearing member;

a power supply for applying an alternating current voltage to said charging means; and control means for controlling said power supply so that an alternating current flowing from said power supply to said charging means is a predetermined current, wherein the predetermined current is determined in accordance with information about the conditions of use of said process cartridge, and the information includes the total value of the time during which the alternating current voltage is applied to said charging means.

2. An image forming apparatus according to claim 1, wherein said process cartridge is further provided with cartridge storage means for storing therein the information about the conditions of use of said process cartridge.

3. An image forming apparatus according to claim 2, wherein said main body of said apparatus is provided with main body storage means for storing therein information of a plurality of control values controlled by said control means preset in conformity with the information about the conditions of use of said process cartridge.

4. An image forming apparatus according to claim 2, wherein said cartridge storage means stores therein information of a plurality of control values controlled by said control means preset in conformity with the information about the conditions of use of said process cartridge.

5. An image forming apparatus according to claim 2, wherein said main body of said apparatus is provided with main body storage means for storing therein information of a plurality of control values controlled by said control means preset in conformity with the information about the conditions of use of said process cartridge, wherein said image forming apparatus further comprises temperature detecting means for detecting temperature, and wherein the alternating current is controlled in conformity with the result of the detection by said temperature detecting means, and said cartridge storage means stores therein information indicative of the relation between the result of the detection by said temperature detecting means and the control values controlled by said control means.

6. An image forming apparatus according to any one of claims 2 to 4, further comprising temperature detecting means for detecting temperature, and wherein the alternating current is controlled in conformity with the result of the detection by said temperature detecting means, and said cartridge storage means stores therein information indicative of the relation between the result of the detection by said temperature detecting means and the control values controlled by said control means.

7. An image forming apparatus according to claim 1, wherein said main body of said apparatus is provided with main body storage means for storing therein the information about the conditions of use of said process cartridge.

8. An image forming apparatus according to claim 7, wherein said main body storage means stores therein information of a plurality of control values controlled by said control means preset in conformity with the information about the conditions of use of said process cartridge.

9. An image forming apparatus according to claim 7, wherein said process cartridge is further provided with cartridge storage means for storing therein information of a plurality of control values controlled by said control means preset in conformity with the information about the conditions of use of said process cartridge.

10. An image forming apparatus according to claim 7, wherein said main body storage means stores therein information of a plurality of control values controlled by said control means preset in conformity with the information about the conditions of use of said process cartridge, wherein said apparatus further comprises temperature detecting means for detecting temperature, wherein said main body storage means stores therein information indicative of the relation between the result of the detection by said temperature detecting means and the control values controlled by said control means.

11. An image forming apparatus according to any one of claims 7 to 9, further comprising temperature detecting means for detecting temperature, wherein said main body storage means stores therein information indicative of the relation between the result of the detection by said temperature detecting means and the control values controlled by said control means.

12. An image forming apparatus according to claim 1, wherein said image bearing member rotates during a rotation time, and wherein the information includes the total value of the rotation time of said image bearing member.

13. An image forming apparatus according to claim 1, wherein said control means controls the alternating current so that the alternating current flowing from said power supply to said charging means during the period from when said power supply has been turned on to a predetermined time thereafter differs from the alternating current flowing from said power supply to said charging means after the predetermined time has elapsed.

14. An image forming apparatus according to claim 1, wherein said control means controls said alternating current so that the alternating current flowing from said power supply to said charging means during the period from when said process cartridge has been mounted with respect to said main body of said apparatus to a predetermined time thereafter differs from the alternating current flowing from said power supply to said charging means after the predetermined has elapsed.

15. An image forming apparatus according to claim 1, wherein said control means controls said alternating current so that the alternating current flowing from said power supply to said charging means during the period from when a new process cartridge has been mounted with respect to said main body of said apparatus to a predetermined time thereafter differs from the alternating current flowing from said power supply to said charging means after the predetermined time has elapsed.

16. An image forming apparatus according to any one of claims 13 to 15, wherein the predetermined time is determined by a developed sheet number.

17. An image forming apparatus according to claim 1, further comprising temperature detecting means for detecting temperature, and wherein the alternating current is controlled in conformity with the result of the detection by said temperature detecting means.

18. An image forming apparatus according to claim 1, further comprising current detection means for detecting the alternating current, and wherein said control means controls the alternating current detected by said current detection means to be a predetermined control value.

19. An image forming apparatus according to claim 18, wherein said current detection means detects the alternating current during the peak of the alternating current voltage applied to said charging means.

20. An image forming apparatus according to claim 18, wherein said current detection means detects the alternating current at a fixed phase synchronized with the alternating current voltage.

21. An image forming apparatus according to any one of claims 1, 18 and 19, wherein said control means controls the alternating current during the peak of the alternating current voltage applied to said charging means so as to assume a predetermined value.

22. An image forming apparatus according to claim 1, wherein said charging means is a charging member provided in contact with said image bearing member.

23. An image forming apparatus according to claim 1, wherein said process cartridge is further provided with developing means for developing an electrostatic image formed on said image bearing member with a developer.

24. An image forming apparatus according to claim 1, wherein said image bearing member is a photosensitive member.

25. An image forming apparatus according to claim 1, wherein the predetermined current is decreased when a calculation value calculated by using the total value reaches a predetermined value.

26. An image forming apparatus comprising:

an image bearing member;

a charging member provided in contact with said image bearing member for charging said image bearing member;

a power supply for applying an alternating current voltage to said charging member; and control means for controlling said power supply so that an alternating current flowing from said power supply to said charging member is a predetermined current, wherein the predetermined current is determined in accordance with information about the conditions of use of said image bearing member, and the information includes the total value of the time during which the alternating current voltage is applied to said charging member.

27. An image forming apparatus according to claim 26, wherein said predetermined current is decreased when a calculation value calculated by using the total value reaches a predetermined value.

28. A process cartridge detachably mountable with respect to a main body of an image forming apparatus, said process cartridge comprising:

an image bearing member;

charging means for charging said image bearing member, said charging means permitting an alternating current voltage to be applied thereto by a power supply when said process cartridge is mounted to the main body; and storage means for storing therein information about the conditions of use of said process cartridge and a plurality of control values for controlling the power supply so that an alternating current flowing from the power supply to said charging means is a predetermined current, said control values corresponding to the information, wherein the information includes the total value of the time during which the alternating current voltage is applied to said charging means.

29. A process cartridge according to claim 28, wherein said image bearing member rotates during a rotation time, and wherein the information includes the total value of the rotation time of said image bearing member.

30. A process cartridge according to claim 28, wherein said storage means stores therein information indicative of the relation between the temperature and the control values of the alternating current, which are variably controlled in comformity with the temperature.

31. A process cartridge according to claim 28, wherein said control values are values for controlling the alternating current voltage so that the alternating current may assume a predetermined value during the peak of the alternating current voltage applied to said charging means.

32. A process cartridge according to claim 28, wherein said control values are values for controlling the alternating current voltage so that the alternating current may assume a predetermined value at a fixed phase synchronized with the alternating current voltage applied to said charging means.

33. A process cartridge according to claim 28, wherein said charging means is a charging member provided in contact with said image bearing member.

34. A process cartridge according to claim 28, further comprising developing means for developing an electrostatic image formed on said image bearing member with a developer.

35. A process cartridge according to claim 28, wherein said image bearing member is a photosensitive member.

36. A process cartridge according to claim 28, wherein the control values include a control value for decreasing the predetermined current when the calculation value calculated by using the total value reaches a predetermined value.

* * * * *

UNITED STATES PATENT AND TRADEMARK OFFICE

CERTIFICATE OF CORRECTION

PATENT NO. : 6,615,002 B2
DATED : September 2, 2003
INVENTOR(S) : Seiji Saito et al.

It is certified that error appears in the above-identified patent and that said Letters Patent is hereby corrected as shown below:

<u>Column 3,</u>
Line 52, "Izr" should read -- (Izr) --.

<u>Column 5,</u>
Line 52, "had" should read -- made --.

<u>Column 16,</u>
Line 1, "turned, on" should read -- turned on, --.

<u>Column 19,</u>
Line 23, "the" (1st occurrence) should be deleted.

<u>Column 21,</u>
Line 5, "has" should read -- time has --.

Signed and Sealed this

Thirteenth Day of April, 2004

JON W. DUDAS
*Acting Director of the United States Patent and Trademark Office*